(12) United States Patent
Ueno et al.

(10) Patent No.: US 8,279,320 B2
(45) Date of Patent: Oct. 2, 2012

(54) IMAGING APPARATUS DATA RECORDING METHOD AND DATA-DISPLAY CONTROL METHOD, AND COMPUTER PROGRAM

(75) Inventors: Ichiro Ueno, Saitama (JP); Baiping Liao, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/780,028

(22) Filed: May 14, 2010

(65) Prior Publication Data

US 2010/0220213 A1    Sep. 2, 2010

Related U.S. Application Data

(62) Division of application No. 11/635,801, filed on Dec. 7, 2006, now Pat. No. 7,742,099.

(30) Foreign Application Priority Data

Dec. 7, 2005    (JP) ................................ P2005-353011

(51) Int. Cl.
  *H04N 5/225*    (2006.01)
  *H04N 5/76*    (2006.01)
(52) U.S. Cl. ................................ 348/333.05; 348/231.5
(58) Field of Classification Search ............... 348/231.3, 348/231.5, 333.01, 333.02, 333.05; 701/521
  See application file for complete search history.

(56) References Cited

U.S. PATENT DOCUMENTS

| | | | |
|---|---|---|---|
| 6,437,797 B1 | 8/2002 | Ota | |
| 6,636,158 B1 | 10/2003 | Bando et al. | |
| 6,657,666 B1 * | 12/2003 | Imagawa et al. | 348/333.02 |
| 6,995,792 B1 | 2/2006 | Ogura | |
| 7,333,054 B2 | 2/2008 | Ueno et al. | |
| 7,508,444 B1 | 3/2009 | Napoli et al. | |
| 2001/0040629 A1 * | 11/2001 | Miyagi et al. | 348/333.02 |
| 2005/0206733 A1 * | 9/2005 | Miyamoto | 348/207.1 |
| 2005/0242988 A1 | 11/2005 | Wakamori | |
| 2006/0187317 A1 | 8/2006 | Montulli et al. | |
| 2006/0238417 A1 | 10/2006 | Jendbro et al. | |
| 2007/0139546 A1 * | 6/2007 | Baiping et al. | 348/333.01 |
| 2007/0263981 A1 | 11/2007 | Ueno et al. | |

FOREIGN PATENT DOCUMENTS

| | | | |
|---|---|---|---|
| JP | 8-094732 A | | 4/1996 |
| JP | 09200666 A | * | 7/1997 |
| JP | 11282076A A | | 10/1999 |
| JP | 2001-166366 A | | 6/2001 |
| JP | 2001-309418 A | | 11/2001 |
| JP | 2004048560 A | * | 2/2004 |

(Continued)

*Primary Examiner* — Jason Whipkey
(74) *Attorney, Agent, or Firm* — Lerner, David, Littenberg, Krumholz & Mentlik, LLP

(57) ABSTRACT

An imaging apparatus includes an imaging unit configured to execute processing to capture an image; a GPS (Global Positioning System) device configured to execute position calculation processing based on data received from a satellite; a power-supply control unit configured to control power supply to the GPS device; an apparatus control unit configured to monitor a state of photographing by a user to calculate a frequency of use of the imaging unit per unit time, and to cause the power-supply control unit to intermittently supply power to the GPS device when the calculated use frequency is lower than a predetermined threshold; and a data-recording control unit configured to generate photographed data attribute information in which positional information acquired in the GPS device is set as attribute information of an acquired image in the imaging unit, and to execute processing to store the photographed data attribute information in a storing unit.

4 Claims, 14 Drawing Sheets

FOREIGN PATENT DOCUMENTS

| | | |
|---|---|---|
| JP | 2004-328134 A | 11/2004 |
| JP | 2004-363823 A | 12/2004 |
| JP | 2004363823 A * | 12/2004 |
| JP | 2005-039323 A | 2/2005 |

* cited by examiner

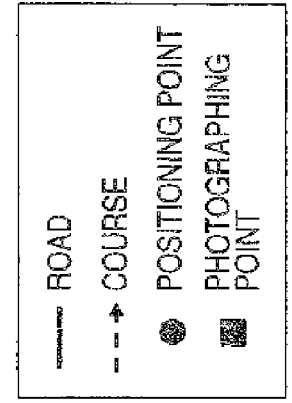
FIG. 10B
PHOTOGRAPHED-DATA ATTRIBUTE INFORMATION
| NO | PHOTOGRAPHING POINT NAME | TIME |
|---|---|---|
| 1 | POINT 1 | T1 |
| 2 | POINT 2 | T2 |
| ... | ... | ... |
$\alpha = (T1-Ta)/(Tb-Ta)$
$X1 = (Xb-Xa)/\alpha + Xa$
$Y1 = (Yb-Ya)/\alpha + Ya$
$\beta = (T2-Td)/(Te-Td)$
$X2 = (Xe-Xd)/\beta + Xd$
$Y2 = (Ye-Yd)/\beta + Yd$
FIG. 10A
GPS LOG
| NO | POINT NAME | LATITUDE | LONGITUDE | TIME |
|---|---|---|---|---|
| 1 | POINT A | Xa | Ya | Ta |
| 2 | POINT B | Xb | Yb | Tb |
| 3 | POINT C | Xc | Yc | Tc |
| 4 | POINT D | Xd | Yd | Td |
| 5 | POINT E | Xe | Ye | Te |
| ... | ... | ... | ... | ... |
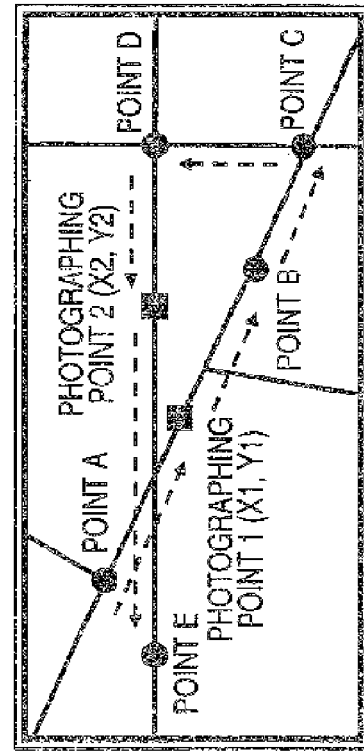
FIG. 10C
DISPLAY INFORMATION

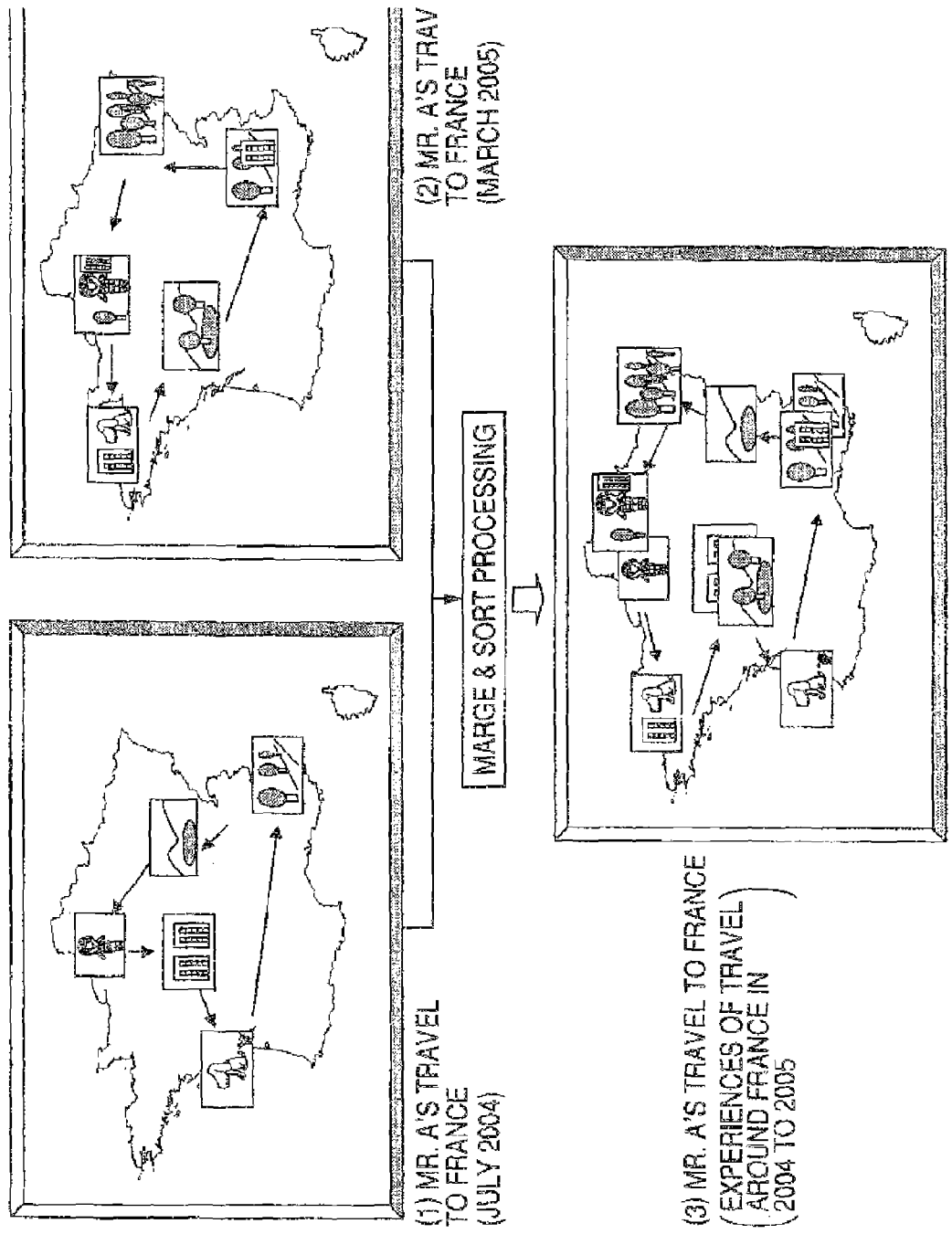

IMAGING APPARATUS DATA RECORDING METHOD AND DATA-DISPLAY CONTROL METHOD, AND COMPUTER PROGRAM

CROSS-REFERENCE TO RELATED APPLICATIONS

The present application is a divisional of U.S. application Ser. No. 11, 635,801, filed on Dec. 7, 2006, which claims priority from Japanese Patent Application No. JP 2005-353011 filed on Dec. 7, 2005, the disclosures of which are hereby incorporated by reference herein.

BACKGROUND OF THE INVENTION

1. Field of the Invention

The present invention relates to an imaging apparatus, a data recording method and a data-display control method, and a computer program. More particularly, the present invention relates to an imaging apparatus that includes a camera provided with a GPS (Global Positioning System), acquires positional information corresponding to photographed data, and executes various kinds of data processing using the acquired information, a data recording method and a data-display control method in the imaging apparatus, and a computer program for causing a computer to execute processing in the imaging apparatus.

2. Description of the Related Art

In recent years, an imaging apparatus such as a video camera or a still camera that is given a GPS (Global Positioning System) function to make it possible to acquire positional information has been proposed and used.

By mounting a GPS device in the imaging apparatus in this way, for example, it is possible to perform processing for, for example, calculating positional information corresponding to a photographed image, calculating a moving locus of a user (a photographer), and presenting the moving locus on a display of a personal computer (PC) or the like to which the camera is connected.

To represent a movement history using the positional information, a method of typically positioning a present location with the GPS device, recording a log including acquired positional information in a memory, and rendering a moving locus on the basis of the log is generally used. This is a method of verifying, with a time stamp serving as time information set in periodically acquired GPS information as a key, correspondence of photographing date and time information corresponding to photographed contents and associating the photographed data and GPS positional information to acquire a moving locus.

However, in this method, it is necessary to typically supply electricity to the GPS device and continuously execute information reception from a satellite to continuously record logs. As a result, power consumption in the GPS device increases. In portable apparatuses such as a video camera and a still camera generally driven by batteries, the batteries undesirably run down earlier than usual.

In order to present a moving locus or the like to the user, it is a general practice to connect the camera to the PC and perform processing for outputting log information and photographed data acquired by the GPS device to the PC and executing data processing for locus presentation processing on the basis of the log information and the photographed data using an application on the PC to present a moving locus on the display of the PC. In other words, processing for instantaneously or conveniently combining the moving locus with a map or the like and displaying the moving locus on a liquid crystal screen or the like of a photographing apparatus body has not been realized.

This is because log data including positional information and time information acquired by the GPS device is recorded in a memory as independent log data and, on the other hand, the photographed data is independently recorded in a separate file together with attribute information such as photographing date and time information. The log data and the photographed data are held in the memories as separate recording data. Thus, in performing the processing, the presentation of locus information, and the like described above, it is necessary to perform processing for searching for, with a time stamp serving as time information set in GPS information as a key, correspondence of photographing date and time information corresponding to photographed contents and processing for associating the photographed data with GPS positional information to calculate a moving locus. When these kinds of processing are executed in the inside of the imaging apparatus, processing loads are excessively large. Thus, in general, the data is outputted to the PC or the like to perform the processing.

In a system in which information acquired by a GPS device and photographed data related information are separately recorded and managed, when it is attempted to perform processing for displaying an imaginary moving locus among photographed contents as a user feels convenient, for example, processing for displaying a positional relation among photographed contents in plural times of travels to France in different periods on one screen in a compound state, complicated processing has to be executed.

A procedure of the processing is as follows. First, plural image data files, in which photographed images of the plural times of travels to France are stored, are selected. Association of image data in the image data files including photographed data generated in these different periods with GPS information logs is executed. Thereafter, GPS information associated with the image data of the plural different image data files is rearranged to generate display data. In this way, the processing is complicated and heavy-load processing including plural processing processes. As a result, it takes time until data is displayed, it is difficult to perform the processing in the imaging apparatus, and processing in the PC is necessary.

SUMMARY OF THE INVENTION

Therefore, it is desirable to provide an imaging apparatus such as a video camera or a still camera mounted with a GPS module, the imaging apparatus controlling power supply to the GPS module to reduce power consumption and recording positional information, time information, and the like acquired by the GPS device in direct association with photographed image data to efficiently and promptly acquire positional information corresponding to the image data and realize various data processing and information display based on the photographed images and the positional information, such as presentation of moving locus information of a user, a data recording method and a data-display control method in the imaging apparatus, and a computer program for causing a computer to execute processing in the imaging apparatus.

According to an embodiment of the invention, there is provided an imaging apparatus including an imaging unit configured to execute processing to capture an image; a GPS (Global Positioning System) device configured to execute position calculation processing based on data received from a satellite; a power-supply control unit configured to control power supply to the GPS device; an apparatus control unit configured to monitor a state of photographing by a user to calculate a frequency of use of the imaging unit per unit time, and to cause the power-supply control unit to intermittently supply power to the GPS device when the calculated use frequency is lower than a predetermined threshold; and a data-recording control unit configured to generate photographed data attribute information in which positional information acquired in the GPS device is set as attribute information of an acquired image in the imaging unit, and to execute processing to store the photographed data attribute information in a storing unit.

Preferably, the data-recording control unit is configured to execute processing to record latitude and longitude information and time information acquired in the GPS device in the storing unit as the photographed data attribute information.

Preferably, the imaging apparatus further includes a data-display control unit configured to read the photographed data attribute information stored in the storing unit and to generate display information indicating a photographing position on a map based on positional information corresponding to image data included in the photographed data attribute information.

Preferably, the data-display control unit is configured to generate display information indicating a moving locus of the user based on photographing time information corresponding to the image data included in the photographed data attribute information.

Preferably, the data-display control unit is configured to read plural pieces of photographed data attribute information corresponding to plural different photographed image data files, to merge the plural pieces of photographed data attribute information, and to generate display information in which photographing positions of images included in the plural different photographed image data files are displayed on a map.

Preferably, the apparatus control unit is configured to calculate a photographing frequency in the imaging apparatus and to cause the power-supply control unit to intermittently supply power to the GPS device and when the calculated photographing frequency is lower than a preset threshold, and to cause the power-supply control unit to supply continuous power to the GPS device when the calculated photographing frequency is equal to or greater than the preset threshold.

According to another embodiment of the invention, there is provided a data recording method in an imaging apparatus, the method including capturing an image; monitoring a state of photographing by a user to calculate a frequency of use of the imaging apparatus per unit time; controlling power supplied to a GPS (Global Positioning System) device configured to execute position calculation processing based on data received from a satellite so that power is intermittently supplied to the GPS device when the calculated use frequency is lower than a predetermined threshold; performing positioning by the GPS device; and generating photographed data attribute information in which positional information acquired in the GPS device is set as attribute information of the captured image and storing the photographed data attribute information in a storing unit.

Preferably, the generating and storing steps include recording latitude and longitude information and time information acquired in the GPS device in the storing unit as the photographed data attribute information.

According to still another embodiment of the invention, there is provided a data-display control method for image data in an imaging apparatus, the method including reading photographed data attribute information stored in a storing unit and acquiring positional information corresponding to image data included in the photographed data attribute information; acquiring map information of a position corresponding to the positional information from a map database based on the positional information corresponding to the image data; and generating display information in which identification information indicating the position corresponding to the image data is set on a map acquired from the map database and outputting the display information to a display unit.

Preferably, the data-display control method further includes generating display information indicating a moving locus of a user based on photographing time information corresponding to the image data included in the photographed data attribute information.

Preferably, the data-display control method further includes reading plural pieces of photographed data attribute information corresponding to plural different photographed image data files, merging the plural pieces of photographed data attribute information, and generating display information in which photographing positions of images included in the plural different photographed image data files are displayed on a map.

According to still another embodiment of the invention, there is provided a computer program that causes a computer to execute a data recording method in an imaging apparatus, the method including capturing an image; monitoring a state of photographing by a user to calculate a frequency of use of the imaging apparatus per unit time; controlling power supplied to a GPS (Global Positioning System) device configured to execute position calculation processing based on data received from a satellite so that power is intermittently supplied to the GPS device when the calculated use frequency is lower than a predetermined threshold; performing positioning by the GPS device; and generating photographed data attribute information in which positional information acquired in the GPS device is set as attribute information of the captured image and storing the photographed data attribute information in a storing unit.

According to still another embodiment of the invention, there is provided a computer program that causes a computer to execute a data-display control method for image data in an imaging apparatus, the method including reading photographed data attribute information stored in a storing unit and acquiring positional information corresponding to image data included in the photographed data attribute information; acquiring map information of a position corresponding to the positional information from a map database based on positional information corresponding to the image data; and generating display information in which identification information indicating the position corresponding to the image data is set on a map acquired from the map database and outputting the display information to a display unit.

The computer programs according to the embodiments are computer programs provided in a computer readable format that can be provided to, for example, a general-purpose computer system capable of executing various program codes using a storage medium or a communication medium, for example, a storage medium such as a CD, an FD, or an MO, or a communication medium such as a network. By providing such programs in the computer readable format, processing corresponding to the programs is realized on the computer system.

Other objects, characteristics, and advantages of the invention will be made apparent by more detailed explanations based on embodiments of the invention described later and the attached drawings. A system in this specification means a logical set of plural apparatuses and is not limited to a system in which the respective apparatuses are provided in an identical housing.

According to an embodiment of the invention, the imaging apparatus such as a video camera having a GPS (Global Positioning System) device executes processing for setting positional information acquired in the GPS device as attribute information corresponding to image data photographed by the imaging unit and for storing the positional information in the storing unit. Thus, in generating display information indicating photographing position information of photographed image data, it is unnecessary to associate the display information with a GPS log, it is possible to directly acquire the display information from attribute information corresponding to the image data, and it is possible to perform efficient display information generation processing with light loads.

Moreover, according to another embodiment of the invention, the frequency of photographing is monitored to calculate a frequency of use of the imaging apparatus per unit time and, when the frequency of use is lower than a predetermined threshold, power is intermittently supplied to the GPS device. Thus, wasteful power consumption in the GPS device is prevented and consumption of a battery is controlled. Intermittent driving of the GPS device makes it possible to maintain a navigation message, which is data received from a GPS satellite, as a navigation message having an unexpired term of validity and to perform position calculation in a short time using the navigation message without performing a new GPS satellite search.

BRIEF DESCRIPTION OF THE DRAWINGS

FIGS. 10A to 10C are diagrams for explaining data recording and display data generation processing executed by an imaging apparatus having a general GPS function;

FIG. 14 is a diagram for explaining an example of data display processing executed in the imaging apparatus according to the embodiment.

DETAILED DESCRIPTION

Details of an imaging apparatus, a data recording method and a data display control method, and a computer program according to embodiments of the invention will be hereinafter explained with reference to the accompanying drawings.

Figure 1:
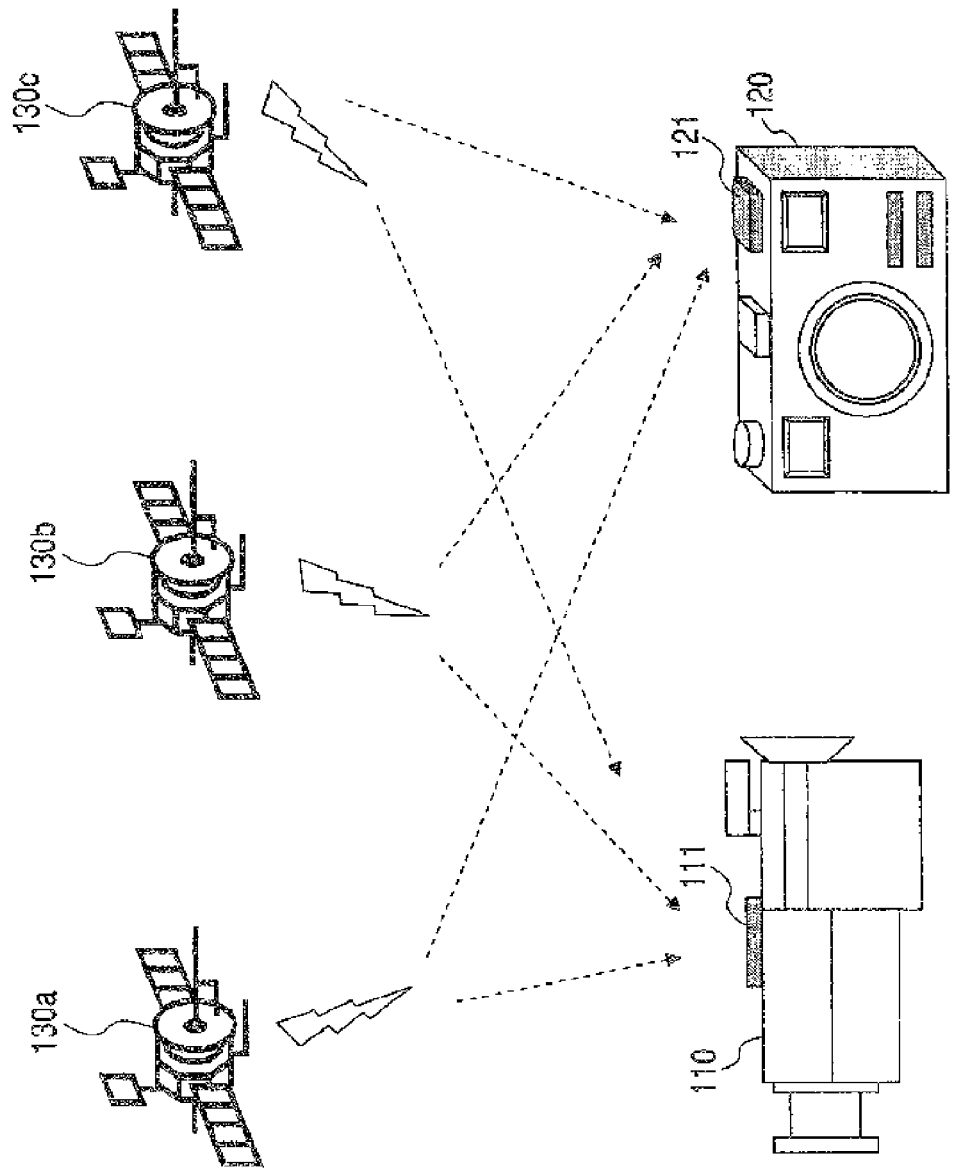
FIG. 1 is a diagram for schematically explaining processing executed by an imaging apparatus according to an embodiment of the invention.

First, processing executed by an imaging apparatus according to an embodiment of the invention will be schematically explained with reference to FIG. 1. In FIG. 1, a video camera 110 that mainly performs moving image photographing and a still camera 120 that performs still image photographing are shown as the imaging apparatus according to the embodiment. These imaging apparatuses include GPS modules 111 and 121.

Each of the GPS modules 111 and 121 is, for example, a packaged module including an antenna unit that receives a GPS radio wave, a signal converting unit that converts the radio wave received, a calculating unit that calculates positional information, a temporary storage unit that stores a result of the calculation, and a communication unit that executes communication with a main control unit (CPU) on an imaging apparatus body side.

The GPS modules 111 and 121 of the respective imaging apparatuses receive radio waves from GPS satellites 130a, 130b, 130c, and the like, which are located in the outer space and transmit GPS positional information, and acquire present latitude and longitude coordinates on the Earth and reception time. A principle of this reception is equivalent to that of the general GPS reception system.

Each of the plural GPS satellites located in the outer space transmits a navigation message including positional information indicating a position of the GPS satellite in the outer space and time information. The GPS modules 111 and 121 deduce the positional information from this navigation message. The navigation messages transmitted by the GPS satellites in the outer space include ephemeris data (almanac and ephemeris) serving as positional information of the satellites and signal transmission time information.

The GPS modules 111 and 121 calculate a three-dimensional position (x, y, z) as positional information. In order to calculate a dimensional position, processing for capturing at least three GPS satellites is necessary. In other words, it is necessary to receive navigation messages from at least three GPS satellites, positions of which are confirmed. Positions of the GPS modules 111 and 121 are determined using reception information (the navigation messages) from these at least three GPS satellites by applying the triangulation method to the processing.

Steps for determining a present position of a GPS receiver using the triangulation method are as follows.

[Step 1] GPS Satellite Capturing Processing

Data from at least three GPS satellites, from which navigation messages can be received in the GPS modules 111 and 121, are received and positions of the respective GPS satellites are checked.

[Step 2] GPS Module Position Determination Processing

Distances from the GPS modules 111 and 112 are calculated and positions of the GPS modules with respect to the center of the Earth are calculated on the basis of the triangulation method.

In the steps, the processing in step 2 can be executed according to arithmetic processing in the GPS modules. On the other hand, in the processing in step 1, that is, the processing for receiving data from at least three GPS satellites, from which navigation messages can be received, and checking positions of the respective GPS satellites, it is effective for reduction of processing time to acquire approximate positional information of the GPS satellites in advance and apply the positional information to the processing.

As described above, the navigation messages transmitted by the GPS satellites include ephemeris data (almanac and ephemeris) serving as positional information of the satellites. When the GPS modules continuously or intermittently perform data reception, it is possible to estimate present positions of the satellites by using data received in the past. If it is possible to use the data received in the past, it is possible to efficiently perform capturing of the GPS satellites in a short time, that is, data reception from the GPS satellites. In other words, it is possible to quickly perform the GPS satellite capturing processing in step 1 above.

However, the navigation messages have a best-before-data set as a term of validity (three months for almanac data and two hours for ephemeris data). When data within the term of validity is held, it is possible to estimate present positions of the satellites by using the data received in the past. Thus, it is possible to efficiently execute the processing in steps 1 and 2 above in a short time and quickly perform position calculation by the GPS modules 111 and 121. However, when data having an unexpired term of validity is not held, it is difficult to perform efficient GPS position estimation to which acquired data applied. Thus, it is necessary to search for GPS satellite positions from the beginning. If such position search is performed, it is difficult to reduce the processing time in step 1. As a result, it takes time to perform calculation of positions to which the GPS modules 111 and 121 are applied.

If the GPS modules 111 and 121 are typically actuated to continuously receive navigation messages, it is possible to typically hold navigation messages having an unexpired term of validity and efficiently capture the GPS satellites. However, for this purpose, power has to be continuously supplied to the GPS modules to drive the GPS modules. On the other hand, operation power for the GPS modules 111 and 121 provided in the imaging apparatuses 110 and 120 is supplied from the batteries of the imaging apparatuses 110 and 120. Thus, there is a request for controlling consumption of the batteries as much as possible.

The imaging apparatuses 110 and 120 according to the embodiment meet such a request. Power supply to the GPS modules 111 and 121 is controlled according to a state of use of the imaging apparatuses 110 and 120 by the user. This makes it possible to reduce power consumption and increase, according to the state of use by the user, speed of processing for acquiring positional information from the GPS modules.

An example of data processing executed in the imaging apparatus according to this embodiment will be explained with reference to FIGS. 2 to 4. First, an example of processing at the time of image photographing will be explained with reference to FIG. 2. As shown in the figure, an imaging apparatus 200 has, as modes, a photographing mode for executing photographing of a moving image or a still image and a reproduction mode for executing reproduction of photographed data.

Figure 2:
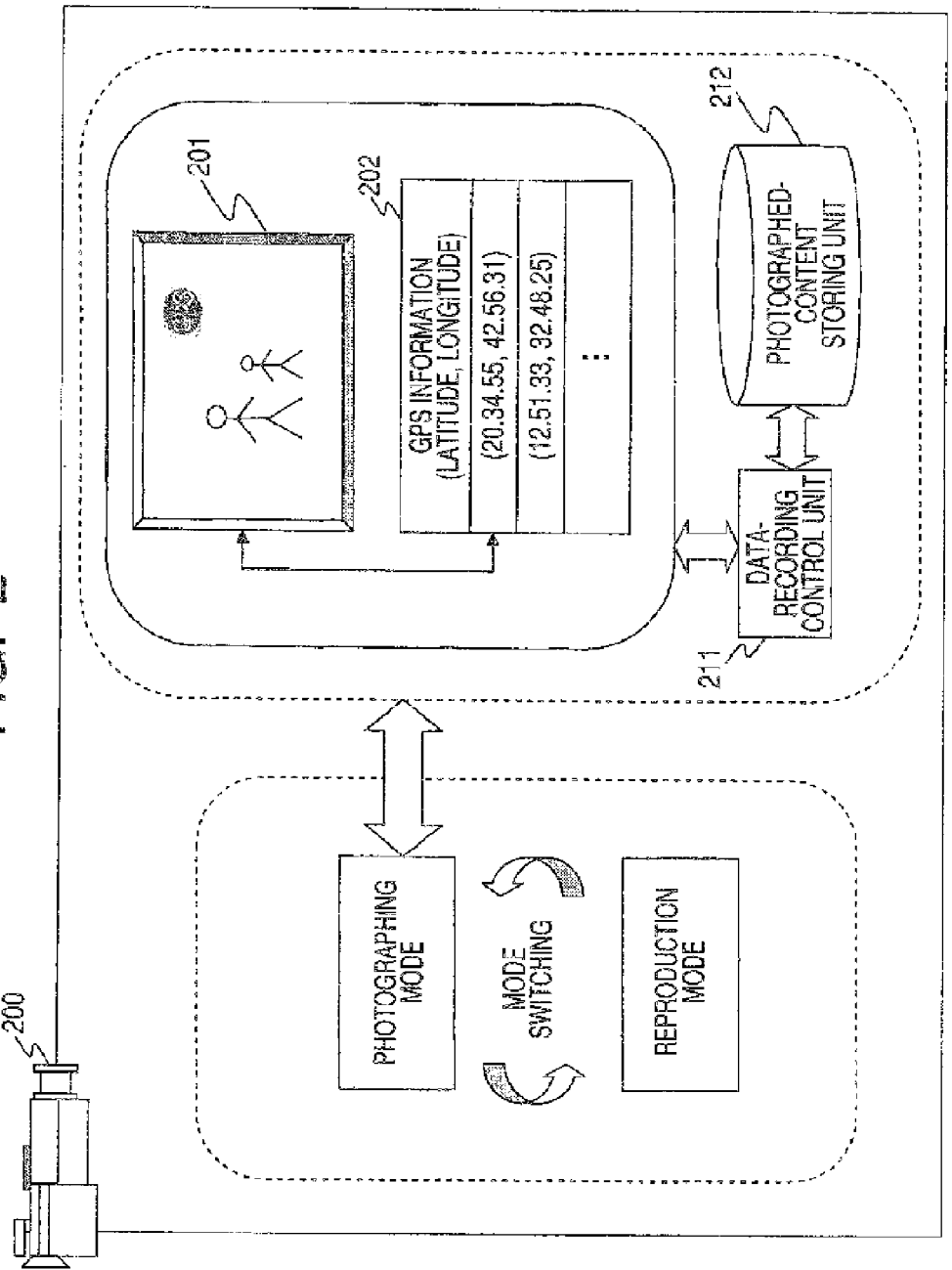
FIG. 2 is a diagram for explaining an example of data processing executed in the imaging apparatus according to the embodiment.
Figure 3:
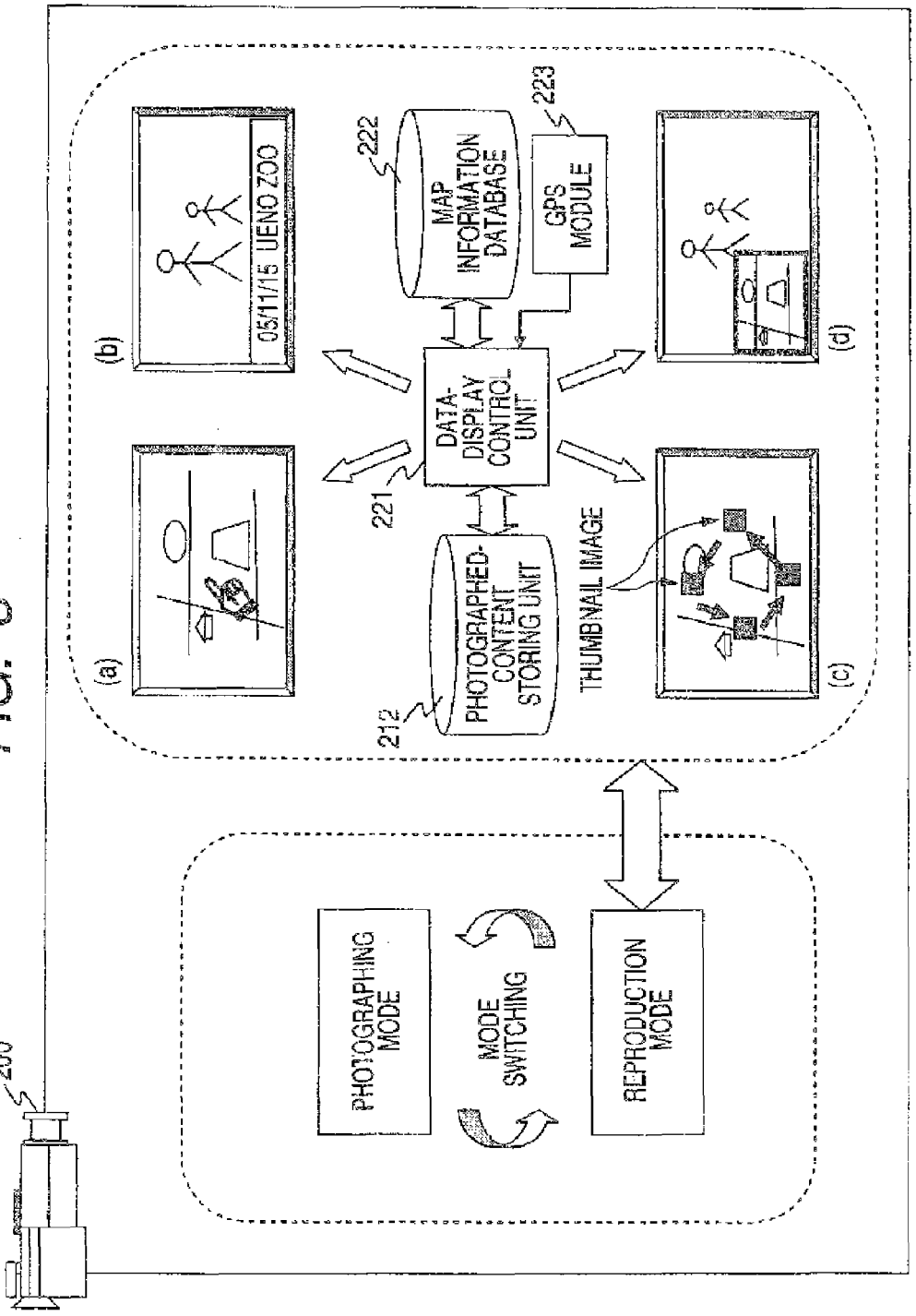
FIG. 3 is a diagram for explaining an example of data processing executed in the imaging apparatus according to the embodiment.

In the photographing mode, as shown in FIG. 2, image data 201 is acquired by imaging processing in an imaging apparatus body. Moreover, positional information (latitude and longitude) 202 of a GPS module is acquired by the GPS module. The data-recording control unit 211 in the imaging apparatus stores these pieces of information in the photographed-content storing unit 212 in association with each other. In other words, the positional information (latitude and longitude) 202 acquired by the GPS module is set as attribute data corresponding to the respective image data and stored in the photographed-content storing unit 212.

An example of processing in the reproduction mode for executing reproduction of photographed data will be explained with reference to FIG. 3. In FIG. 3, four examples of display data (a) to (d) displayed on a monitor of the imaging apparatus in the reproduction mode are shown. These display data (a) to (d) are generated according to the control by a data-display control unit 221 in the imaging apparatus. The data-display control unit 221 acquires positional information recorded as data in the photographed-content storing unit 212, that is, image data and as attribute data of the image data, information in a map information database 222 including data such as maps, addresses, and photographing spot information serving as data associated with latitude and longitude information, and positional information inputted from a GPS module 223 and generates display data.

For example, the display data (a) is an example of display in which map information is displayed on the monitor to present the present positional information to the user. In this display, the present positional information is inputted from the GPS module 223 and information clearly indicating a present position is displayed on a map in accordance with the positional information inputted. This is equivalent to an example of display of general navigation information.

The display data (b) is an example of display in which the photographed image data stored in the photographed-content storing unit 212 is displayed and a photographing place is displayed in characters on the basis of map data, which is acquired from the map information database 222 on the basis of the positional information recorded as the attribute data in association with the image data, and spot information.

The display data (c) is an example of display in which the photographed image data stored in the photographed-content storing unit 212 are arranged in an order of a photographing sequence and display for indicating transition of a photographing position on a map is performed. Photographed data are displayed on the map as thumbnail images.

The display data (d) is an example of display in which photographed data and map data are displayed in combination. On the basis of positional information recorded as attribute data of the photographed data, a map of an area corresponding to the positional information is displayed in a part of the monitor.

Figure 4:
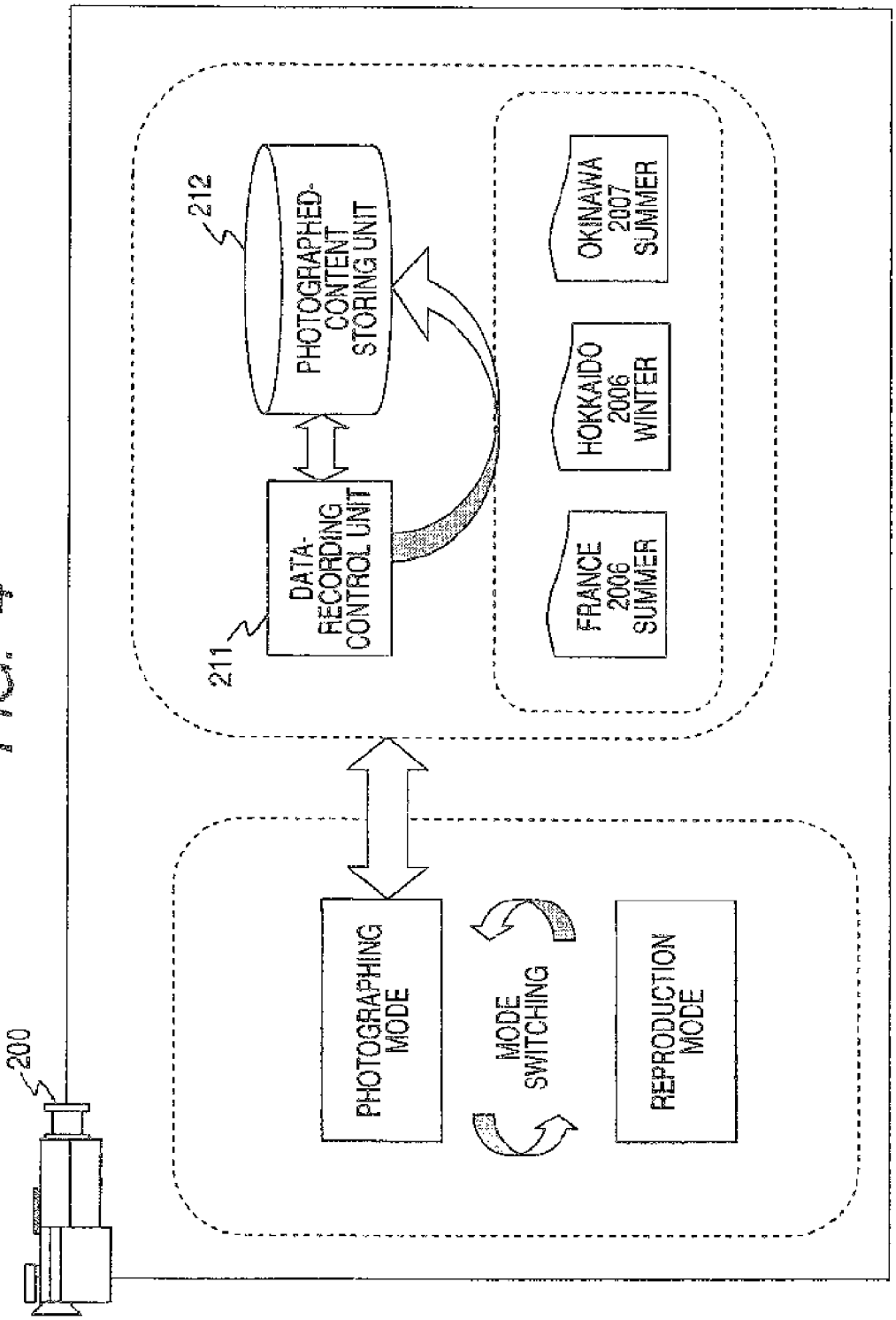
FIG. 4 is a diagram for explaining an example of data processing executed in the imaging apparatus according to the embodiment.

Moreover, in the photographing mode, as shown in FIG. 4, it is possible to perform processing for collectively storing photographed contents in folders corresponding to photographing places on the basis of positional information serving as attribute data corresponding to photographed data. For example, it is possible to collectively store photographed data corresponding to a specific area in one file according to processing in which the data-recording control unit 211 stores data in a certain latitude and longitude range in one folder, for example, a folder with a title [France, 2006 Summer] on the basis of latitude and longitude information acquired as attribute information corresponding to a photographed image. Since photographing date and time data is also given to the photographed data as attribute information, it is also possible to classify photographed data on the basis of time information of the photographing date and time data.

The examples of data processing executable in the imaging apparatus have been explained. Various other kinds of processing are possible. For example, it is possible to support photographing by the user on the basis of positional information from the GPS module even at the time of the photographing mode. For example, it is possible to perform processing for indicating on the monitor whether it is possible to receive a GPS radio wave in a place where photographing is presently performed, processing for illustrating a present position on a screen map as in the car navigation, or processing for displaying place name information of a present position in a photographing screen. It is possible to realize these kinds of processing by causing the imaging apparatus to execute the processing by the data-display control unit 221 explained with reference to FIG. 3 at the time of photographing.

Figure 5:
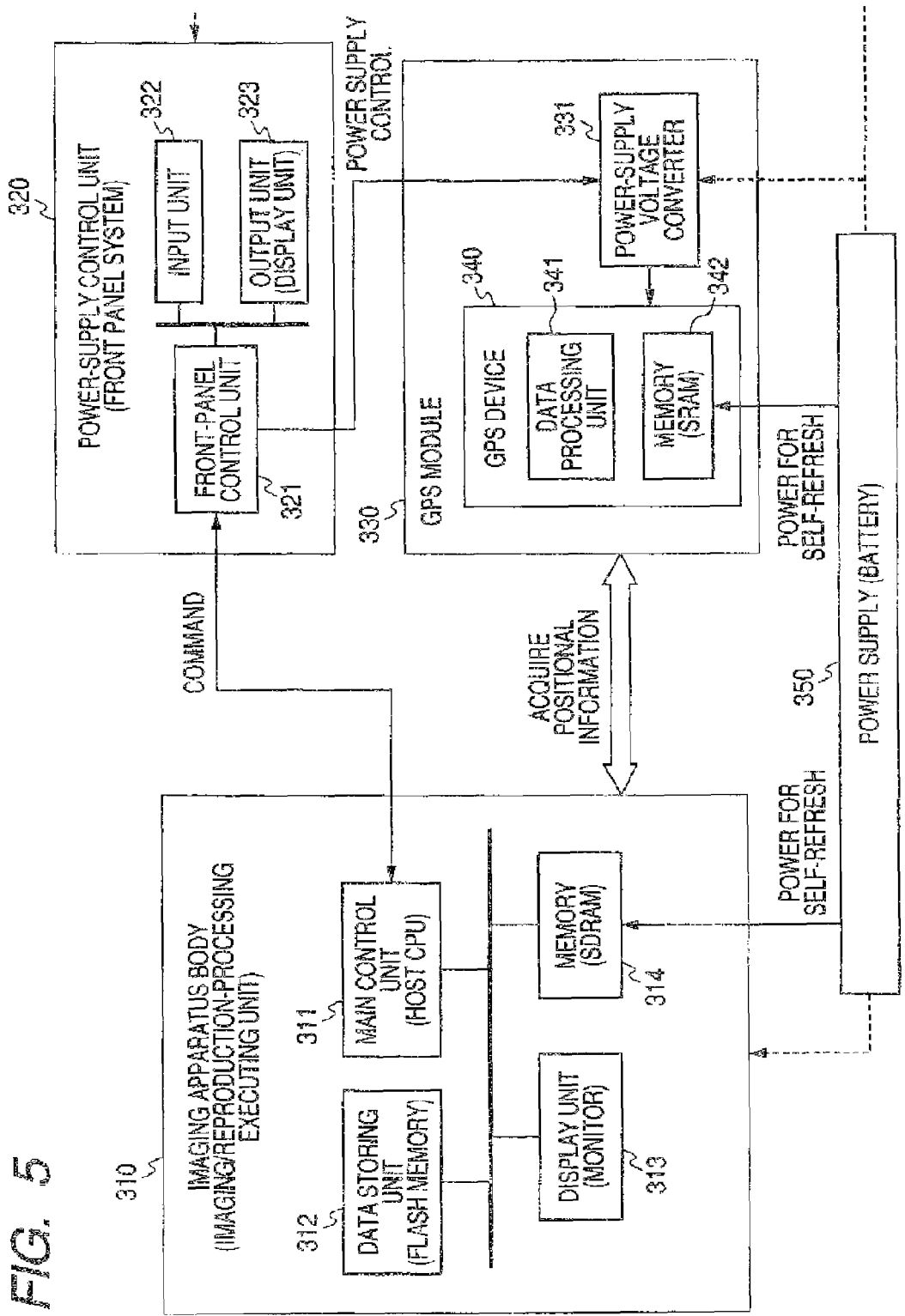
FIG. 5 is a diagram for explaining a structure of the imaging apparatus according to the embodiment.

A structure of the imaging apparatus according to this embodiment will be explained with reference to FIG. 5. In FIG. 5, components of the imaging apparatus having the GPS module are divided into a photographing apparatus body 310, a power-supply control unit 320, a GPS module 330, and a power supply (battery) 350.

The imaging apparatus body 310 has a function of a video camera or a still camera. The imaging apparatus body 310 has display data generation processing functions such as imaging processing, reproduction of photographed data, and generation and output of various kinds of display information based on the photographed data. The imaging apparatus body 310 includes a main control unit (a host CPU) 311, a data storing unit (a flash memory) 312 that records photographed data and the like, a memory (an SDRAM) 314 that performs primary data storage, and a display unit (a monitor) 313.

The power-supply control unit 320 is constituted by, for example, a front panel system. The power-supply control unit 320 includes a front-panel control unit 321, an input unit 322 including various switches such as a power supply switch, and an output unit 322 that performs display of photographing information. The GPS module 330 includes a GPS device 340 and a power-supply-voltage converter 331. The GPS device 340 is inputted with electric power converted into a predetermined voltage via the power-supply-voltage converter 331 and driven. The GPS device 340 executes satellite capturing and navigation message acquisition processing. The GPS device 340 includes a data processing unit 341 that executes navigation data recording, position calculation processing, and the like and a memory (an SRAM) 342 that stores navigation data acquired and positional data calculated.

The power supply (the battery) 350 supplies electric power to the imaging apparatus body 310, the power-supply control unit 320, and the GPS module 330. However, as described later, power supply to the GPS module 330 is controlled according to a state of execution of imaging processing by the user. Electric power for self-refresh processing is supplied to the memory (the SDRAM) 314 of the imaging apparatus body 310 and the memory (the SRAM) 342 of the GPS device 340.

Control for supply of electric power for driving the GPS device 340 will be explained. Electric power for driving the GPS device 340 is inputted to the GPS device 340 via the power-supply-voltage converter 331. The electric power for driving the GPS device 340 is controlled on the basis of a state of execution of photographing by the user measured in the main control unit (the host CPU) 311 of the imaging apparatus body 310.

The main control unit (the host CPU) 311 of the imaging apparatus body 310 measures frequency of photographing by the user and judges whether photographing is executed at frequency higher than a predetermined threshold. When it is judged that the photographing is executed at high frequency higher than the predetermined threshold, the main control unit (the host CPU) 311 issues a control command to the front-panel control unit 321 to execute continuous power supply to the GPS device 340. The front-panel control unit 321 controls the power-supply-voltage converter 331 of the GPS module 330 to execute continuous power supply to the GPS device 340. In a period of the continuous power supply, continuous reception of navigation messages and position calculation processing are executed in the GPS device 340.

On the other hand, when it is judged in the main control unit (the host CPU) 311 of the imaging apparatus body 310 that the photographing by the user is executed at low frequency lower than the predetermined threshold, the main control unit (the host CPU) 311 stops the continuous power supply to the GPS device 340 and outputs a control command to the front-panel control unit 321 to execute intermittent power supply. The front-panel control unit 321 controls the power-supply-voltage converter 331 of the GPS module 330 to execute intermittent power supply to the GPS device 340. In a period of the intermittent power supply, intermittent reception of navigation messages and position calculation processing are executed in the GPS device 340.

In other words, the GPS device 340 performs an intermittent positioning operation independently regardless of whether a power supply for the imaging apparatus body is on or off. When the power-supply control unit (the front panel system) 320 instructs to turn on a power supply for the GPS device 340, the power-supply-voltage converter 331 supplies electric power to the GPS device 340. The GPS device 340 starts a positioning operation.

A flow of basic processing will be explained with reference to a diagram shown in FIG. 5. First, when the imaging apparatus body 310 is turned on according to user operation of the input unit 322 of the power-supply control unit (the front panel system) 320, the GPS device 340 in the GPS module 330 is also turned on according to a command from the power-supply control unit (the front panel system) 320, that is, electric power is supplied.

When the power supply is started, first, the GPS device 340 loads backup data of navigation data necessary for capturing GPS satellites from the data storing unit 312 of the imaging apparatus body 310 and uses the backup data for capturing of GPS satellites. In other words, navigation data, that is, almanac and ephemeris data acquired by the GPS device 340 in the past are stored in the data storing unit 312 serving as a nonvolatile memory of the imaging apparatus body 310. The GPS device 340 acquires these data and captures GPS satellites.

However, as described above, terms of validity are set for the respective navigation data. When the terms of validity have expired, since it may be impossible to apply navigation messages of the navigation data acquired, the GPS device 340 needs to capture GPS satellites at random.

When the GPS device 340 succeeds in capturing of GPS satellites necessary for calculating positional information, latest navigation data acquired by the GPS device 340 and positional information calculated by the GPS device 340 are inputted to the imaging apparatus body 310. The control unit (the host CPU) 311 of the imaging apparatus body 310 outputs a command to the power-supply control unit (the front panel system) 320 to cause the GPS module 331 to shift to an intermittent driving state. Then, the GPS module 331 shifts to the intermittent driving state according to an instruction from the power-supply control unit (the front panel system) 320. Thereafter, GPS device 340 continues an intermittent measurement operation independently from transition of states of on and off of power supply to the imaging apparatus body 310.

In this case, latest positional information serving as positioning information based on a navigation message acquired anew in the data processing unit 341 of the GPS device 340 is stored in the memory (the SRAM) 342 in the GPS device 340. When the imaging apparatus body 310 is turned on next time, the positional information stored in the memory (the SRAM) 342 in the GPS device 340 is read out by a GPS control application running on the imaging apparatus body 310.

In this data readout time, the control unit (the host CPU) 311 judges whether the positional information and the navigation message acquired are newer than the data stored in the data storing unit 312 serving as a nonvolatile memory of the imaging apparatus body 310. When the positional information and the navigation message are newer, the control unit (the host CPU) 311 stores the new acquired data in the data storing unit 312 and executes data update.

Figure 6:
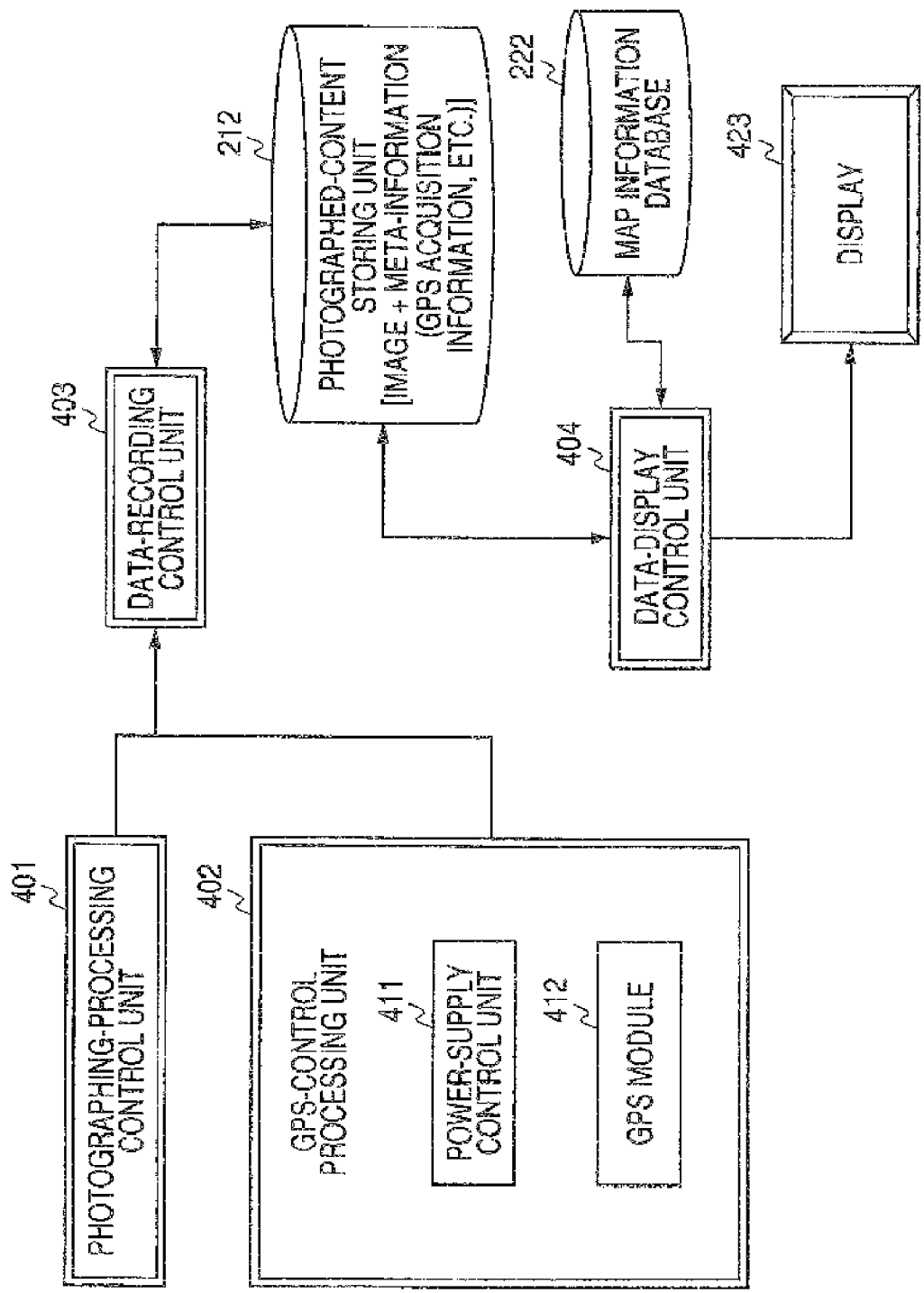
FIG. 6 is a diagram for explaining respective kinds of control processing executed by the imaging apparatus according to the embodiment.

A constitution for control of various kinds of data processing executed in the imaging apparatus according to this embodiment will be explained with reference to FIG. 6. Control modules that execute main data processing control in the imaging apparatus according to the embodiment of the invention are shown in FIG. 6. As the control modules, a photographing-processing control unit 401, a GPS-control processing unit 402, a data-recording control unit 403, and a data-display control unit 404 are shown in FIG. 6. Control by these units is basically control executed by the main control unit (the host CPU) 311 of the imaging apparatus body shown in FIG. 5. However, for convenience of explanation, the respective kinds of control are shown by category. When programs for executing the respective kinds of controls are read out and executed by the main control unit (the host CPU) 311, control for various kinds of hardware is performed and respective kinds of processing are executed.

The photographing-processing control unit 401 executes photographing processing similar to that of a general camera. Photographing processing image data is recorded in the photographed-content storing unit 212 via the data-recording control unit 403. The data-recording control unit 403 further inputs positional information and time information (a time stamp) acquired by a GPS module 412 under the control in the GPS-control processing unit 402. The data-recording control unit 403 sets these kinds of information acquired by the GPS module as attribute information corresponding to photographed image data and records the information acquired by the GPS module in the photographed-content storing unit 212.

The GPS-control processing unit 402 executes power supply control for the GPS module 412 via a power-supply control unit 411 and provides the data-recording control unit 403 with the positional information acquired in the GPS module 412.

The data-display control unit 404 acquires the photographed image data recorded in the photographed-content storing unit 212 and the attribute information corresponding to the image data. The data-display control unit 404 further acquires information from the map information database 222 including data such as maps, addresses, and photographing spot information serving as data associated with latitude and longitude information. The data-display control unit 404 generates display information that is presented on a display 423. For example, the data-display control unit 404 performs processing for, for example, superimposing thumbnails of plural images photographed in a travel of the user on locus information shown on a map and presenting the thumbnails.

For example, the data-display control unit 404 executes processing for invoking photographed contents recorded in the photographed-content storing unit 212 in response to a user request and combining the photographed contents with map information and place name information held in the map information database 222 to display the photographed contents and processing for automatically classifying the photographed contents recorded in the photographed-content storing unit 212 with positional information as a key and displaying a result of the classification on the display 423.

Details of control of the GPS module, in particular, power supply control processing executed in the GPS-control processing unit 402, in particular, data recording processing in the data-recording control unit 403, and data display processing in the data-display control unit 404 will be explained.

[(1) GPS Module Control Processing]

Figure 7:
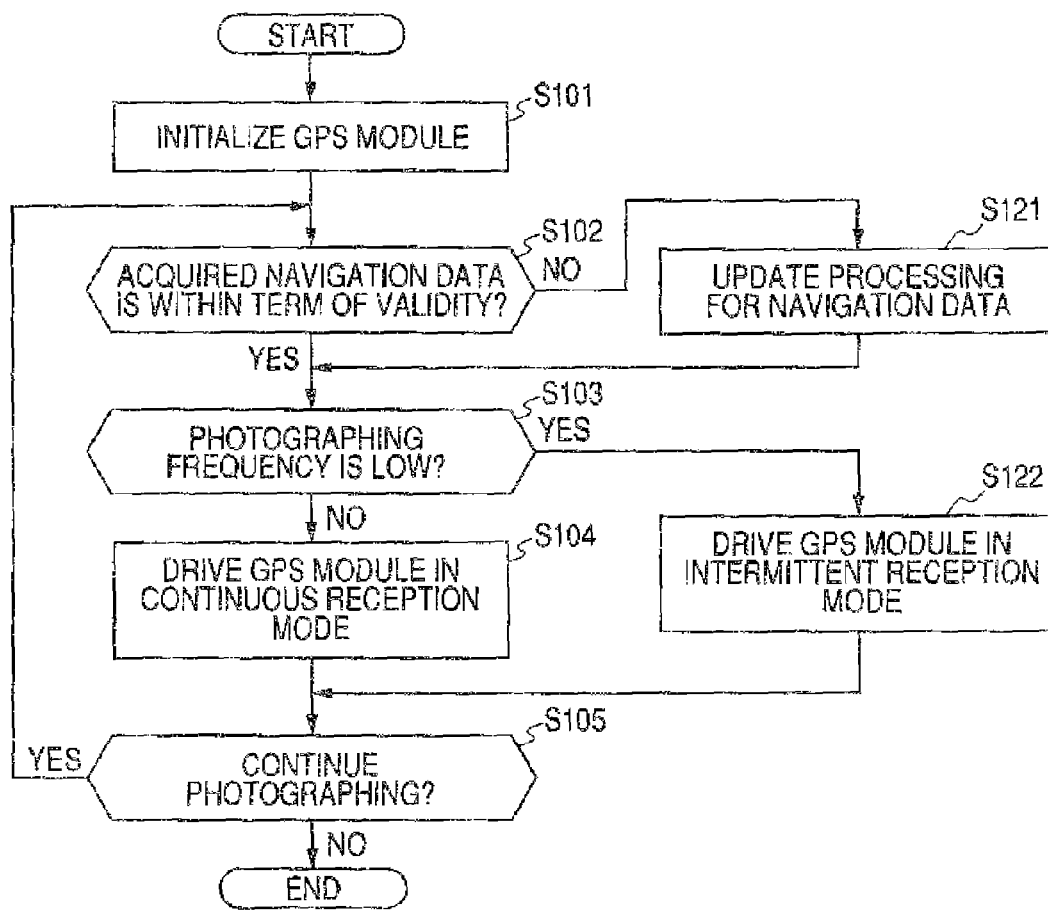
FIG. 7 is a flowchart for explaining a power supply control sequence of a GPS module executed in the imaging apparatus according to the embodiment.

First, a power supply control sequence for the GPS module executed in the GPS-control processing unit 402 will be explained with reference to a flowchart shown in FIG. 7. Processing control according to this flow is processing executed by the control by the main control unit (the host CPU) 311 of the imaging apparatus body 310. First, when the imaging apparatus is turned on by the user, in step S101, the main control unit (the host CPU) 311 initializes setting necessary for operation in the GPS module.

When the initialization of the GPS module is completed, in step S102, according to the control by the main control unit (the host CPU) 311 of the imaging apparatus body, an application on the imaging apparatus side inquires of the GPS module about a term of validity of a latest navigation message held by the GPS module in the memory. The application judges whether the acquired navigation message is data having an unexpired term of validity or data having an expired term of validity.

When the term of the navigation message has already expired, the main control unit (the host CPU) 311 proceeds to step S121, drives the GPS device regardless of timing of a photographing action, and causes the GPS device to update the navigation message. After the update of the navigation message, the application on the imaging apparatus side monitors frequency of photographing by the user. An application executed in the imaging apparatus body holds a predetermined photographing frequency threshold and compares a state of photographing processing actually performed by the user with this threshold. For example, the application monitors a photographing state of the user for n images/minute in still image photographing processing and for n frames/minute in moving image photographing processing, acquires photographing frequency data, and compares the photographing frequency data acquired with the threshold held in advance.

When it is judged in the comparison with the threshold that the frequency of photographing by the user is low (step S103: Yes), the main control unit (the host CPU) 311 proceeds to step S122 and executes control to intermittently drive the GPS device in order to control power consumption. In other words, the main control unit (the host CPU) 311 executes intermittent power supply to the GPS device and causes the GPS device to intermittently execute reception of navigation messages and calculation of positions.

Specifically, as explained with reference to FIG. 5 above, when it is judged in the main control unit (the host CPU) 311 of the imaging apparatus body 310 that photographing at low frequency of photographing by the user lower than the predetermined threshold is executed, the main control unit (the host CPU) 311 outputs a control command to the front-panel control unit 321 to stop continuous power supply to the GPS device 340 and execute intermittent power supply. The front-panel control unit 321 controls the power-supply-voltage converter 331 of the GPS module 330 to execute intermittent power supply to the GPS device 340. In a period of the intermittent power supply, intermittent reception of navigation messages and position calculation processing are executed in the GPS device 340.

On the other hand, when it is judged in the comparison with the threshold that the frequency of photographing by the user is not low (step S103: No), the main control unit (the host CPU) 311 proceeds to step S104 and controls the GPS module to typically perform satellite capturing in order to acquire highly accurate positional information that follows photographing timing as much as possible.

In other words, the main control unit (the host CPU) 311 of the imaging apparatus body 310 outputs a control command to the front-panel control unit 321 to execute continuous power supply to the GPS device 340. The front-panel control unit 321 controls the power-supply-voltage converter 331 of the GPS module 330 to execute continuous power supply to the GPS device 340. In a period of the continuous power supply, continuous reception of navigation messages and position calculation processing are executed in the GPS device 340.

Thereafter, in step S105, the main control unit (the host CPU) 311 judges whether the photographing action by the user is continued (including a state in which the power supply is temporarily turned off). When the photographing action is continuously executed, the main control unit (the host CPU) 311 repeatedly executes the processing in step S102 and the subsequent steps, that is, the processing from the check of a term of validity of a navigation message. In a period when the photographing processing is executed, in step S102, the main control unit (the host CPU) 311 of the imaging apparatus body 310 periodically performs verification of a term of validity of an acquired navigation message in the GPS device. When the term of validity of the acquired navigation message has been expired, the main control unit (the host CPU) 311 proceeds to step S121 and causes the GPS device to execute processing for updating navigation data.

When it is judged in step S105 that the photographing action by the user is not continued, for example, when the power supply of the imaging apparatus is turned off and is not turned off again for a certain length of time, the main control unit (the host CPU) 311 stops the power supply to the imaging apparatus body 310 and the GPS module and completes the processing.

Figure 8:
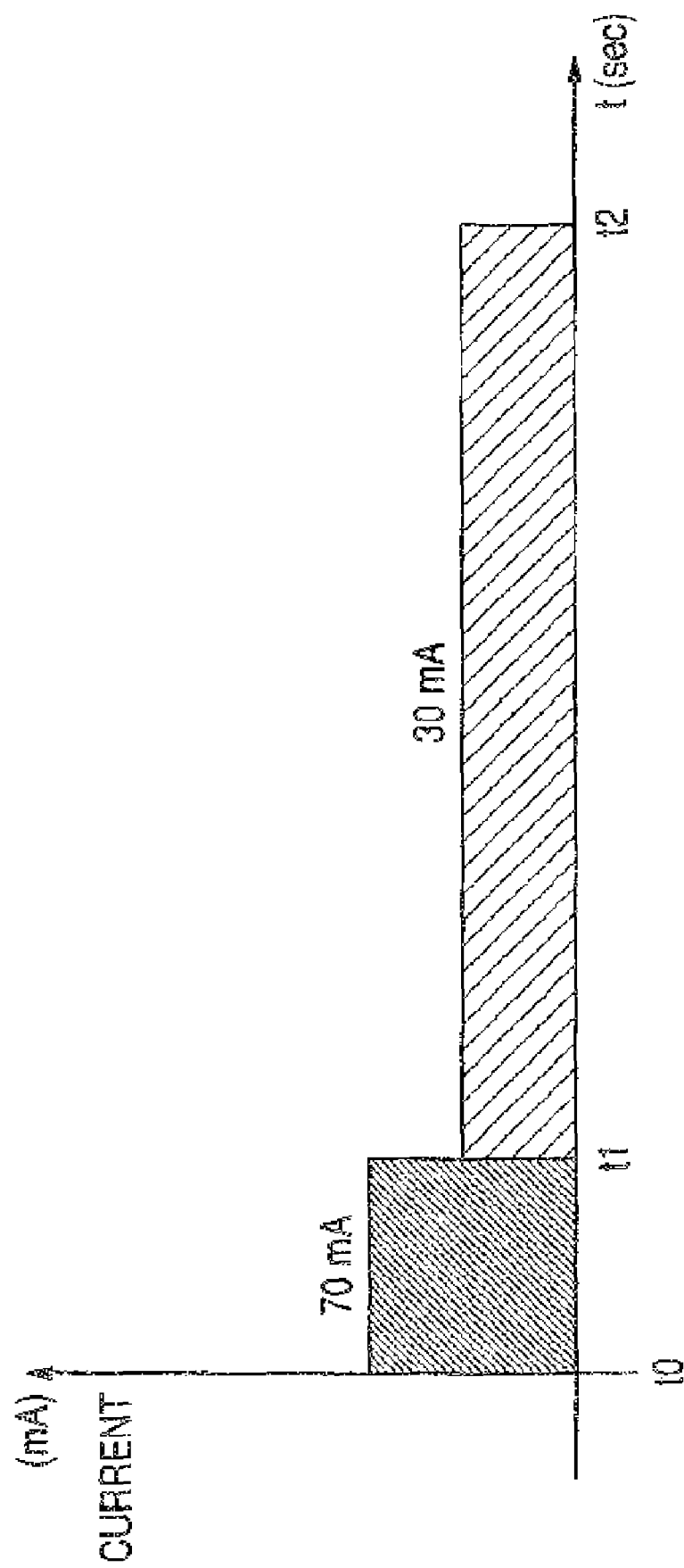
FIG. 8 is a diagram for explaining an amount of power consumption in a GPS device.

An amount of power consumption in the GPS device will be explained with reference to FIGS. 8 and 9. FIG. 8 is a graph of a change of an amount of power consumption in the GPS device at the time when the power supply to the GPS device is turned on, capturing of GPS satellites is executed, and navigation messages are continuously acquired. The abscissa indicates time t (sec) and the ordinate indicates an electric current (mA) corresponding to the amount of power consumption of the GPS device.

Power supply to the GPS device is started at time (t0). At time (t0), it is assumed that a term of validity of an acquired navigation message has been expired and it may be impossible to use the navigation message. In this case, the GPS device executes processing for capturing plural GPS devices necessary for position measurement. In other words, the GPS device searches for plural GPS device and needs to receive navigation messages from a GPS satellite found as a result of the search. An electric current of about 70 mA is consumed for this processing.

When the GPS device succeeds in capturing of a GPS satellite and a navigation message having an unexpired term of validity is recorded in the memory at time (t1), thereafter, it is unnecessary to search for a new GPS satellite. It is possible to shift to a tracking mode for tracking the captured GPS satellite. In this tracking mode, it is possible to perform tracking to which a navigation message having an unexpired term of validity is applied. The electric current consumption is reduced to about 30 mA. When the GPS device continuously receives navigation messages, it is necessary to continuously supply an electric current of 30 mA to the GPS device.

Figure 9:
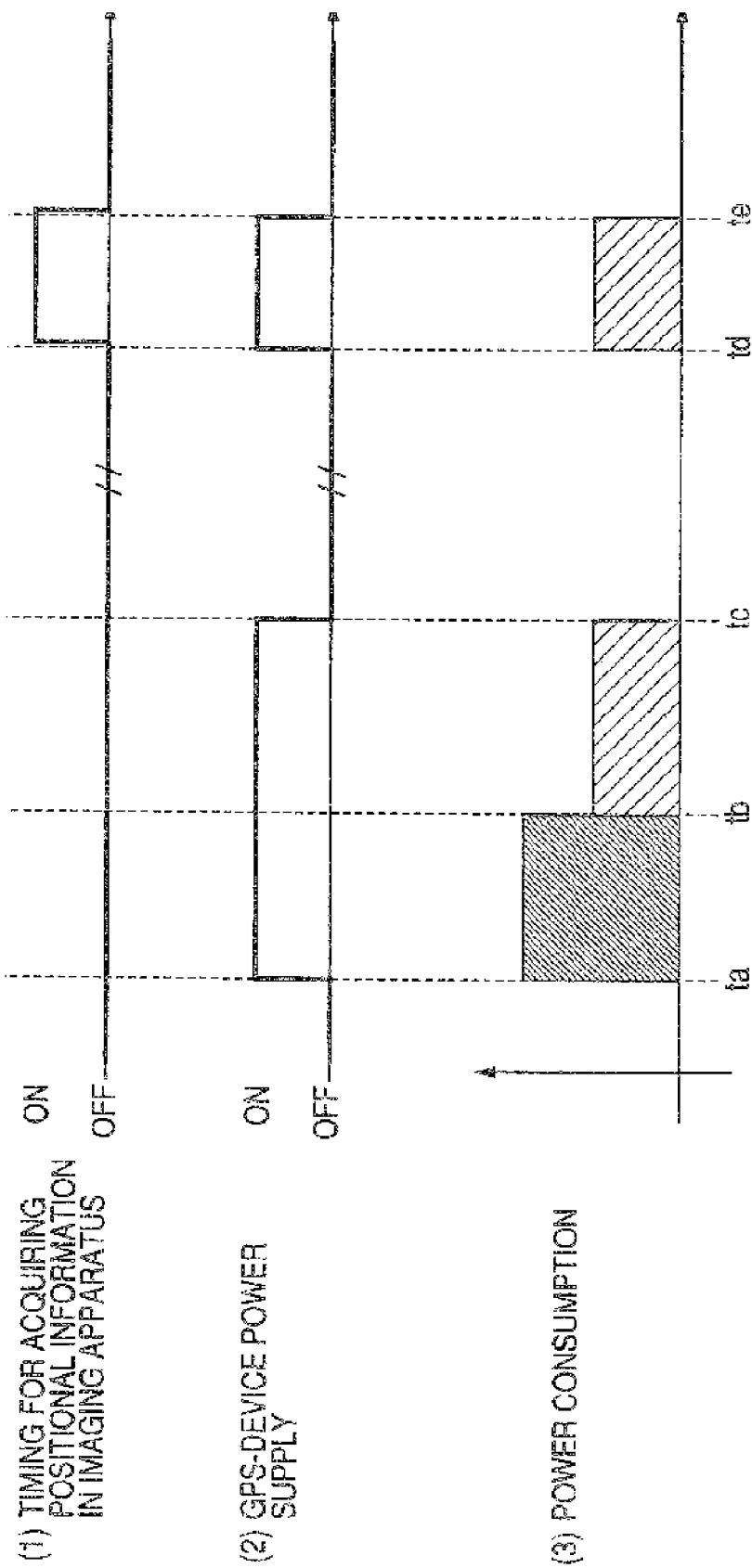
FIG. 9 is a diagram for explaining an amount of power consumption in the GPS device.

In an example shown in FIG. 9, power supply to the GPS device is executed in an intermittent mode. (1) in FIG. 9 indicates timing when the application on the imaging apparatus body side acquires positional information from the GPS module. When the power supply is on, the application acquires positional information from the GPS module. (2) in FIG. 9 indicates a transition in states of on and off of the power supply of the GPS device. In this example, since the power supply is executed in the intermittent mode, on and off of the power supply is switched in accordance with predetermined control timing for the intermittent mode. (3) in FIG. 9 indicates a change in an amount of power consumption in the GPS module.

Power supply to the GPS device is started at time (ta). At time (ta), as at time (t0) in FIG. 8, it is assumed that a term of validity of an acquired navigation message has been expired and it may be impossible to use the navigation message. In this case, the CPS device executes processing for capturing plural GPS devices necessary for position measurement. In other words, the GPS device searches for plural GPS devices and needs to receive a navigation message from a GPS satellite found as a result of the search. An electric current of about 70 mA is consumed for this processing.

When the GPS device succeeds in capturing a GPS satellite and a navigation message having an unexpired term of validity is recorded in the memory at time (tb), thereafter, it is unnecessary to search for a new GPS satellite. It is possible to shift to a tracking mode for tracking the captured GPS satellite. In this tracking mode, it is possible to perform tracking to which a navigation message having an unexpired term of validity is applied. The electric current consumption is reduced to about 30 mA.

At time (tc), when it is judged in the monitoring processing of the application on the imaging apparatus side that frequency of photographing by the user is lower than the threshold set in advance, power supply to the GPS device is set in the intermittent mode and the power supply to the GPS device is temporarily stopped. Thereafter, at time (td), at timing when the application executes a request for acquisition of positional information to the GPS device, power supply to the GPS device is resumed. At this point, power consumption of the GPS device occurs.

However, when a period in which power supply to the GPS device is stopped is not long, the acquired navigation message is maintained within the term of validity. It is possible to perform GPS satellite tracking, to which a navigation message having an unexpired term of validity is applied, without executing search for a new GPS satellite. In other words, it is possible to receive a navigation message in the tracking mode and perform processing at low power consumption. In a period of time (td) to (te), when the GPS device succeeds in acquisition of a new navigation message, stores the navigation message in the memory, and provides the application with positional information calculated, power supply to the GPS device is stopped and power consumption is reduced to 0. Power consumption is reduced by executing processing in such an intermittent mode. When a period in which power supply to the GPS device is stopped is not long, the acquired navigation message is maintained within the term of validity. This makes it possible to execute acquisition of a new navigation message from the GPS satellite, to which a navigation message having an unexpired term of validity is applied, in a short time.

Timing for resuming power supply to the GPS device (e.g., time (td) in FIG. 9) is timing controlled by the control unit of the imaging apparatus body. In the example shown in FIG. 9, timing for resuming power supply to the GPS device is set to coincide with timing when the imaging apparatus body inputs positional information from the GPS device. Various settings are possible for a setting for an interval of on and off of the power supply to the GPS device in this intermittent control. For example, on and off of the power supply may be repeated at a predetermined fixed time interval. Time shorter than the term of validity of the navigation message may be set as longest time in which the power supply is off. Such a setting makes it possible to typically maintain a state in which a navigation message having an unexpired term of validity can be used.

In the example explained in the embodiment described above, the GPS module is built in the imaging apparatus. However, it is also possible to apply a GPS system externally attached to the imaging apparatus by USB connection or the like when the power supply is shared by the imaging apparatus body and the GPS module. An effect of power reduction and an increase in speed of the processing for acquiring positional information are realized.

Moreover, in the example explained the embodiment, the power supply is shared by the GPS module and the imaging apparatus body. However, it is also possible to realize the effect of controlling power consumption of the GPS module even when power supplies are separately set for the GPS module and the imaging apparatus body. Speed of restart is improved and an increase in speed of the processing for acquiring positional information is realized.

[(2) Data Recording and Display Control Processing]

Details of the data recording processing in the data-recording control unit 403 and the data display processing in the data-display control unit 404 in FIG. 6 will be explained.

As explained above with reference to FIG. 6, image data photographed in the photographing-processing control unit 401 is recorded in the photographed-content storing unit 212 via the data-recording control unit 403. Moreover, the data-recording control unit 403 inputs positional information and time information (a time stamp) acquired by the GPS module 412 under the control in the GPS-control processing unit 402, sets these kinds of information acquired by the GPS module as attribute information corresponding to photographed image data, and records the information acquired by the GPS module in the photographed-content storing unit 212.

The data-display control unit 404 acquires the photographed image data and the attribute information corresponding to the image data recorded in the photographed-content storing unit 212. The data-display control unit 404 further acquires information from the map information database 222 including data such as maps, addresses, and photographing spot information serving as data associated with latitude and longitude information. The data-display control unit 404 generates display information that is presented on the display 423. For example, the data-display control unit 404 performs processing for, for example, superimposing thumbnails of plural images photographed in a travel of the user on locus information shown on a map and presenting the thumbnails.

In recording the photographed image data in the photographed-content storing unit 212, the data-recording control unit 403 in the imaging apparatus according to this embodiment inputs the positional information and the time information (the time stamp) acquired by the GPS module 412. The data-recording control unit 403 sets and records these kinds of information acquired by the GPS module as attribute information corresponding to the photographed image data.

As explained in the section of the background art above, the camera in the past having a general GPS function typically positions a present position with the GPS device and records GPS log data including acquired positional information in the memory. Processing for recording the positional information acquired by the GPS module as attribute information of the photographed image data is not performed. Therefore, it is necessary to execute processing for associating the positional information with the photographed image data when processing for displaying the data is performed. This causes an increase in loads of the data display processing.

A method in the past and a method according to this embodiment will be explained. The method in the past is a method of separately recording GPS log data and attribute data, which is recorded in association with photographed data, in the storing unit. The method according to this embodiment is a method of setting positional information, time information, and the like acquired from GPS log data as attribute data, which is recorded in association with photographed data, and recording the positional information, the time information, and the like in the storing unit.

First, the method in the past will be explained with reference to FIGS. 10A to 10C. Data structures of the GPS log data separately recorded in the storing unit of the imaging apparatus and the attribute data recorded in association with the photographed data in the past will be explained. Further, processing for associating data necessary in executing display processing using these recorded data, for example, processing for analyzing a photographing position for the photographed data and identifiably displaying the photographing position on a map will be explained.

GPS log data including positional information and time information acquired from navigation data continuously received by a GPS is shown in FIG. 10A. Attribute information of photographed data recorded in association with an image photographed in photographing processing by the user is shown in FIG. 10B. Photographing time information is recorded in the attribute information. As information recorded in a GPS log, latitude, longitude, and time are recorded in association with names of points (A, B, C, etc.) serving as identification information set as index data. The GPS module continuously positions points in order from the point A and repeats acquisition of information.

On the other hand, in the photographing apparatus body, photographed contents (a still image or a moving image) are saved as a file in the storing unit according to a photographing action of the user. In this saving processing, a time stamp serving as photographing time information is recorded in the photographed contents. In an example shown in FIG. 10B, photographing date and time information is recorded in association with names of points (1, 2, etc.) serving as identification information of an image photographed by the user.

The GPS log (a) and the photographed data attribute information (b) are held in the storing unit as separate independent data files. For example, in performing processing for displaying photographed data (thumbnails) on a map in association with photographing positions and presenting locus information to the user, the user transfers the GPS log (a), the photographed data attribute information (b), and the photographed image data to a PC and executes data processing based on these data transferred to generate display information using dedicated PC application software.

First, the PC application performs processing for calculating photographing positions of respective photographed images included in the photographed data attribute information (b). This processing is performed by associating the photographed time information in the photographed data attribute information (b) with the time information included in the GPS log (a). For example, data [No. 1, point 1] included in the photographed data attribute information (b) is data photographed at time [T1]. It is assumed that T1 is within time Ta to Tb in log data included in the GPS log (a).

In this case, the photographing point 1 at time T1 is calculated from a position (a point "a") at time Ta and a position (a point "b") at time Tb in the log data included in the GPS log. According to so-called linear interpolation processing, the photographing point 1 at time T1 is calculated from two GPS logs, that is, positional information (Xa, Ya) of the point A and positional information (Xb, Yb) of the point B. Latitude and longitude (X1, Y1) of the photographing point 1 of photographing performed at time T1 are calculated from the following equation.

$$\alpha=(T1-Ta)/(Tb-Ta)$$

$$X1=(Xb-Xa)/\alpha+Xa$$

$$Y1=(Yb-Ya)/\alpha+Ya$$

The equation is an equation for calculating a position at time T1 in time Ta to Tb (latitude and longitude (X1, Y1) at the point 1) according to linear interpolation by applying a position at time Ta (the point A) and a position at time Tb (the point B) included in the GPS log, which are accurately identified, to the processing.

Similarly, a photographing point 2 at time T2 included in the photographed data attribute information is calculated from two GPS logs, that is, positional information (Xd, Yd) of the point D and positional information (Xe, Ye) of the point E. Latitude and longitude (X2, Y2) of the photographing point 2 of photographing performed at time T2 are calculated from the following equation.

$$\beta=(T2-Td)/(Te-Td)$$

$$X2=(Xe-Xd)/\beta+Xd$$

$$Y2=(Ye-Yd)/\beta+Yd$$

The equation is an equation for calculating a position at time T2 in time Td to Te (latitude and longitude (X2, Y2) at the point 2) according to linear interpolation by applying a potion at time Td (the point D) and a position at time Te (the point E) included in the GPS log, which are accurately identified, to the processing.

Display information shown in FIG. 10C is generated and displayed on a display on the basis of photographing position information of respective images calculated in this way. The display information shown in FIGS. 10A to 10C is data indicating a moving locus of the user. This is an example in which positional information of points positioned by the GPS module and photographing points is presented on a map and a course is calculated on the basis of time information and indicated by arrows.

In this display processing, first, map information corresponding to photographing positions of image data calculated by the processing described above is acquired from the map information database. Icons (black circles) indicating the positions of the points A, B, C, and the like included in the GPS log are indicated on a map. Icons (black squares) indicating a position (latitude and longitude (X1, Y1) of the point 1) and a position (latitude and longitude (X2, Y2) of the point 2) calculated by the processing are displayed on the map. Arrows connecting the respective icons displayed are displayed. In this way, the course is presented to the user.

As described above, when the GPS log data and the attribute information corresponding to the photographed image data are managed as separate recording data, in displaying moving locus information, it is necessary to perform processing for associating the GPS log data and the attribute information corresponding to the photographed image data, resulting in inefficient and heavy-load processing.

The data recording and display control processing in the imaging apparatus according to this embodiment will be explained with reference to FIGS. 11A and 11B. Details of the data recording processing in the data-recording control unit 403 and the data display processing in the data-display control unit 404 in FIG. 6 will be explained.

Image data photographed in the photographing-processing control unit 401 shown in FIG. 6 is recorded in the photographed-content storing unit 212 via the data-recording control unit 403. The data-recording control unit 403 inputs positional information and time information acquired by the GPS module 412 in this recording processing, sets these kinds of information acquired by the GPS module as attribute information corresponding to the photographed image data, and records the information acquired by the GPS module in the photographed-content storing unit 212.

Figures 11A, 11B:
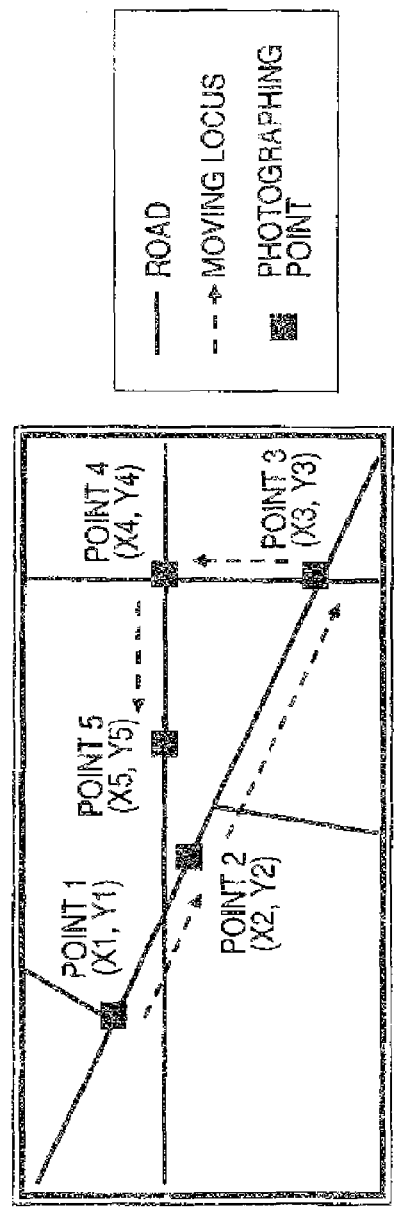
FIGS. 11A and 11B are diagrams for explaining data recording and display data generation processing executed in the imaging apparatus according to the embodiment.

In FIG. 11A, a data structure of photographed data attribute information generated by the data-recording control unit 403 shown in FIG. 6 and recorded in the photographed-content storing unit 212 is shown. In the photographing apparatus body, photographed contents (a still image or a moving image) are saved as a file in the storing unit according to a photographing action of the user. In this saving processing, a time stamp serving as photographing time information is recorded in the photographed contents. Moreover, the data-recording control unit 403 inputs the positional information and the time information acquired by the GPS module 412 and records the positional information and the time information as attribute information corresponding to the photographed contents (the still image or the moving image). As the time information, a time stamp set in the imaging apparatus body or time information acquired by a GPS is selected and recorded.

The data-display control unit 404 shown in FIG. 6 can apply the information recorded in the photographed-content storing unit 212, that is, the photographed data attribute information shown in FIG. 11A to the processing, generate, for example, display information shown in FIG. 11B, and present the display information on the display. In generating the display information, it is unnecessary to perform, for example, the processing for associating the display information with the GPS log data explained with reference to FIGS. 10A to 10C above. It is possible to generate display data according to simple processing.

The photographed-data attribute information shown in FIG. 11A is acquired. Data such as map information serving as data associated with latitude and longitude information included in the photographed-data attribute information is acquired from the map information database 222 and presented on the display. Photographing points of the photographed data attribute information shown in FIG. 11A are displayed as icons (black squares). Moreover, arrows are displayed in accordance with the time information included in the photographed data attribute information shown in FIG. 11A.

As described above, the processing executed in the data-display control unit 404 is processing to which only the information included in the photographed data attribute information shown in FIG. 11A is applied. This is remarkably light processing compared with the processing explained with reference to FIGS. 10A to 10C above. Therefore, it is possible to perform processing in the control unit (the main CPU) on the imaging apparatus side surely and in a short time without performing processing for, for example, outputting data to the PC or the like and generating display data in an application on the PC side.

Figure 12:
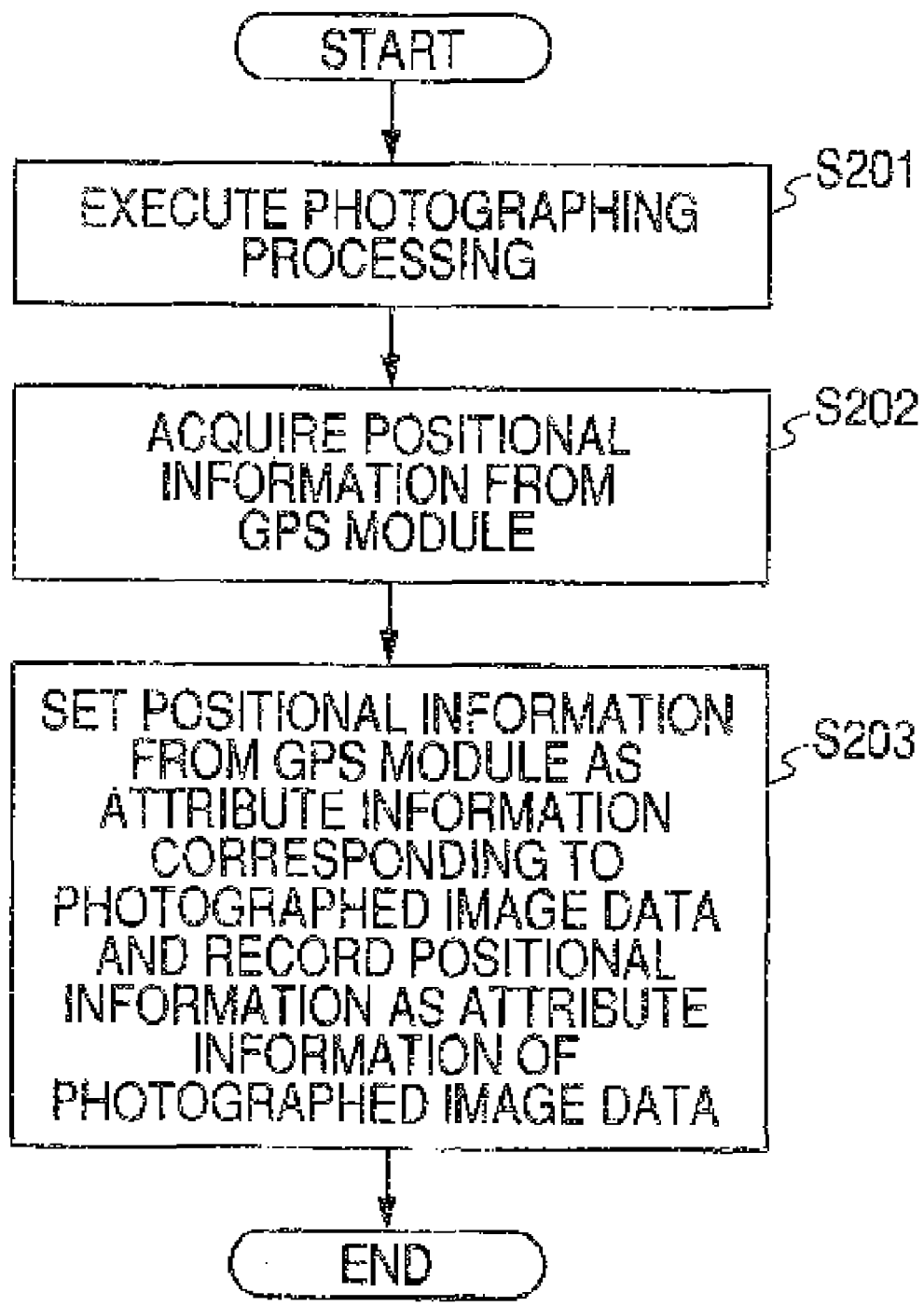
FIG. 12 is a flowchart for explaining a data recording processing sequence executed in the imaging apparatus according to the embodiment.
Figure 13:
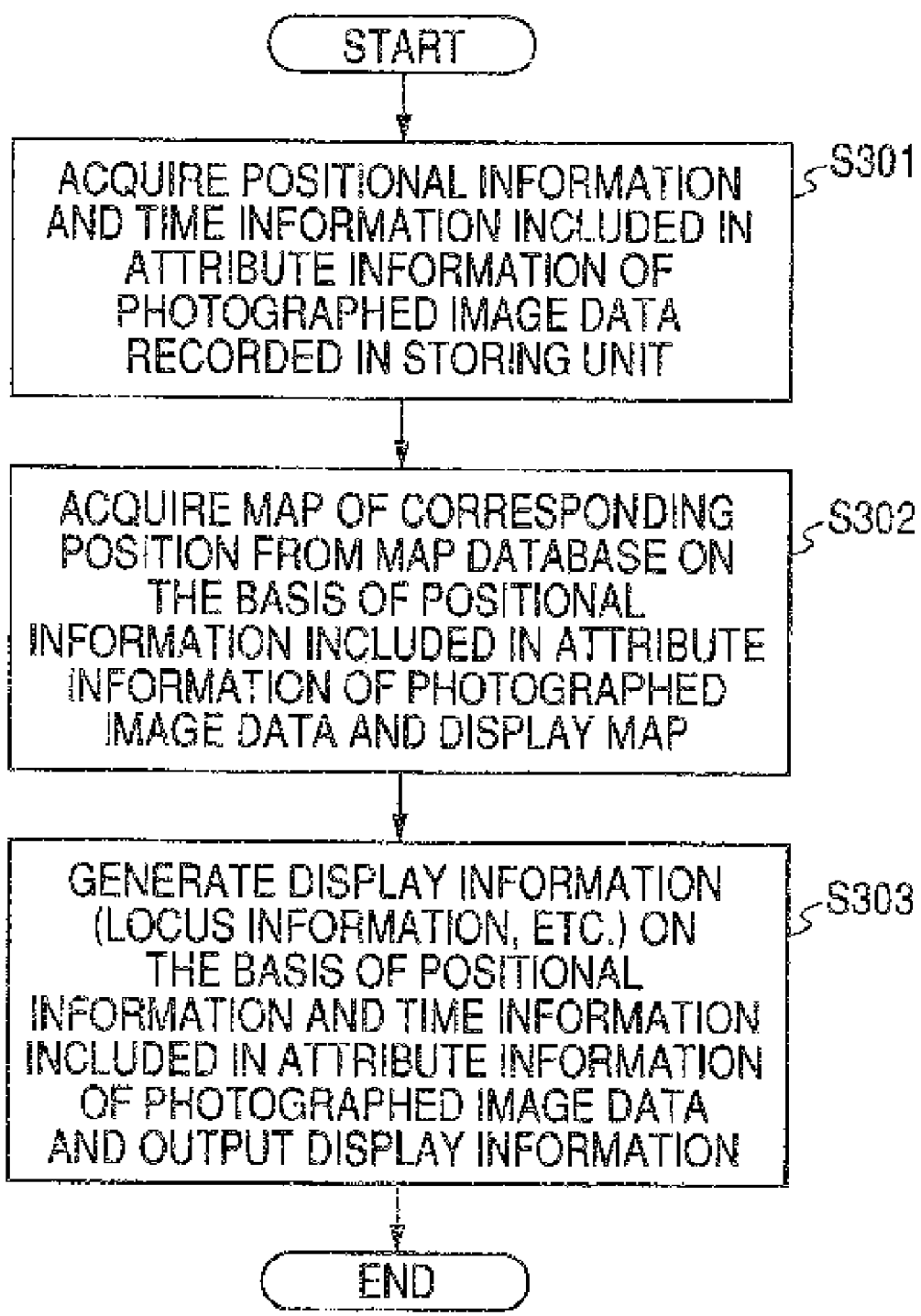
FIG. 13 is a flowchart for explaining a data display processing sequence executed in the imaging apparatus according to the embodiment.

Processing sequences of the data recording processing and the data display processing executed in the imaging apparatus according to this embodiment will be explained with reference to FIGS. 12 and 13. First, the processing sequence of the data recording processing executed in the imaging apparatus according to this embodiment will be explained with reference to a flowchart shown in FIG. 12.

In step S201, photographing processing is executed by the user. Photographing processing control is executed according to the control by the photographing-processing control unit 401 shown in FIG. 6. In step S202, processing for acquiring positional information in the GPS module is executed. The processing for acquiring positional information in the GPS module is executed under the processing control by the GPS-control processing unit 402 shown in FIG. 6. As explained above, power supply to the GPS device is controlled according to frequency of photographing by the user. The processing for acquiring positional information is performed as processing with electric power saved.

In step S203, the data-recording control unit 403 shown in FIG. 6 executes input of photographed image data and input of information from the GPS module and executes processing for setting positional information and time information inputted from the GPS module as attribute information corresponding to the photographed image data and recording the positional information and the time information in the recording unit as attribute information corresponding to the photographed image data. In other words, the data-recording control unit 403 generates the attribute information shown in FIG. 11A and records the attribute information in the storing unit.

The processing sequence of the data display processing executed in the imaging apparatus according to this embodiment will be explained with reference to FIG. 13. This processing is processing executed in the data-display control unit 404 shown in FIG. 6. First, in step S301, the data-display control unit 404 acquires the attribute information of the photographed image data recorded in the photographed-content storing unit 212 shown in FIG. 6. This data is the data shown in FIG. 11A. The attribute information includes positional information and time information associated with respective photographed images.

In step S302, the data-display control unit 404 acquires, on the basis of the positional information included in the attribute information of the photographed image data, a map of positions corresponding to the positional information from the map database and displays the map on the display. Moreover, in step S303, the data-display control unit 404 generates display information (locus information, etc.) on the basis of the positional information and the time information included in the attribute information of the photographed image data and outputs the display information. For example, the data-display control unit 404 outputs the display information shown in FIG. 11B.

It is possible to execute the data recording processing explained with reference to the flow shown in FIG. 12 and the data display processing explained with reference to the flow in FIG. 13 sequentially or in parallel. In other words, it is possible to execute processing for acquiring photographing operation and positioning information and recording these pieces of information and processing for generating display information, to which recorded data is applied, sequentially or as parallel processing.

In the imaging apparatus according to this embodiment, it is possible to efficiently execute generation of complicated display data by applying the photographed data attribute information shown in FIG. 11A to the processing. An example of generation of display data will be explained with reference to FIG. 14.

An example shown in FIG. 14 is an example of display processing in which, when there are plural different photographed content files, for example, photographed content files different temporally from one another, these files are merged, sort processing is executed when necessary, and, for example, thumbnails and locus information are collectively presented on the basis of plural photographed contents.

In (1) in FIG. 14, data obtained by plotting thumbnails photographed by Mr. A when he traveled France in July 2004 on a map is shown. In (2) in FIG. 14, a result obtained by plotting contents photographed when Mr. A traveled France on a slightly different route eight months later (March 2005) is shown. It is possible to generate these display data by applying the photographed data attribute information shown in FIG. 11A to the processing. In other words, it is possible to realize the display data by displaying thumbnails of photographed data instead of the icons indicating the photographing points of the locus information shown in FIG. 11B.

Moreover, it is possible to generate display data in (3) in FIG. 14 by applying attribute information included in a photographed image data file corresponding to the display data in (1) in FIG. 14 and a different photographed image data file corresponding to the display data in (2) in FIG. 14 to the processing. For example, in the photographed image data file corresponding to the display data in (1) in FIG. 14, attribute information corresponding to images of the photographed image data file, that is, the photographed data attribute information including latitude, longitude, and time information shown in FIG. 11A is included. In the photographed image data file corresponding to the display data in (2) in FIG. 14, photographed data attribute information including latitude, longitude, and time information corresponding to images of the photographed image data file is included.

The data-display control unit 404 shown in FIG. 6 is capable of generating, for example, time-series attribute data, in which pieces of attribute information corresponding to plural image files are combined, by merging these two kinds of photographed data attribute information and executing sort processing when necessary. It is possible to generate the display data shown in (3) in FIG. 14, that is, one display data, to which plural different content data files are applied, by executing the display information generation processing explained with reference to FIGS. 11A and 11B or FIG. 13 on the basis of such attribute data merged.

The display data shown in (3) in FIG. 14 is imaginarily created on the basis of the two data in (1) and (2) in FIG. 14. The display data in (3) in FIG. 14 is a summary of all Mr. A's travels to France. In this way, the imaging apparatus according to this embodiment directly records positional information acquired by the GPS as the attribute information corresponding to the photographed data. Thus, it is possible to efficiently calculate photographing positions corresponding to respective images simply by acquiring the attribute information. It is also possible to easily and efficiently generate various display data and present the display data.

The generation of such display data is easily realized in the imaging apparatus. Thus, for example, it is also possible to load photographed content information of the same format held in PCs or other photographing apparatuses to the imaging apparatus owned by the user himself, generate display data on the basis of the data loaded, and output the display data.

The invention has been explained in detail with reference to the specific embodiment of the invention. However, it is obvious that those skilled in the art can perform modifications and substitutions of the embodiment without departing from the spirit of the invention. The invention has been disclosed in a form of illustration and should not be interpreted limitedly. To judge the spirit of the invention, the appended claims should be taken into consideration.

It is possible to execute the series of processing explained in the specification using hardware or software or a composite constitution of the hardware and the software. In executing the processing by software, it is possible to install a computer program having a processing sequence recorded therein in a memory in a computer built in dedicated hardware and cause the computer to execute the computer program or install the computer program in a general-purpose computer capable of executing various kinds of processing and cause the computer to execute the computer program.

For example, it is possible to record the computer program in a hard disk or a ROM (Read Only Memory) serving as a recording medium in advance. Alternatively, it is possible to temporarily or permanently store (record) the computer program in a removable recording medium such as a flexible disk, a CD-ROM (Compact Disc Read Only Memory), an MO (Magneto optical) disk, a DVD (Digital Versatile Disc), a magnetic disk, or a semiconductor memory. It is possible to provide such a removable recording medium as so-called package software.

In addition to installing the computer program in the computer from the removable recording medium, it is also possible to transfer the computer program from a download site to the computer by radio or transfer the computer program from the download site to the computer by wire via a network such as the Internet. The computer can receive the computer program transferred in that way and install the computer program in a recording medium such as a hard disk built in the computer.

The various kinds of processing described in this specification may be executed not only in time series according to the above description but also in parallel or individually according to processing capability of an apparatus that executes the processing or when necessary. The system in this specification is a logical set of plural apparatuses and is not limited to a system in which the respective apparatuses are provided in an identical housing.

As explained above, according to an embodiment of the invention, the imaging apparatus such as a video camera having a GPS (Global Positioning System) device executes processing for setting positional information acquired in the GPS device as attribute information corresponding to image data photographing in the imaging unit and storing the positional information in the storing unit. Thus, in generating display information indicating photographing position information of photographed image data, it is unnecessary to execute processing for associating the display information with a GPS log, it is possible to directly acquire the display information from attribute information corresponding to the image data, and it is possible to perform efficient display information generation processing with light loads.

Moreover, according to another embodiment of the invention, frequency of photographing is monitored to calculate frequency of use per unit time and, when the frequency of use is lower than a predetermined threshold, intermittent power supply to the GPS device is executed. Thus, wasteful power consumption in the GPS device is prevented and consumption of a battery is controlled. Intermittent driving of the GPS device makes it possible to maintain a navigation message, which is reception data from a GPS satellite, in a navigation message having an unexpired term of validity and perform position calculation in a short time using the navigation message without performing new GPS satellite search.

It should be understood by those skilled in the art that various modifications, combinations, sub-combinations, and alterations may occur depending on design requirements and other factors insofar as they are within the scope of the appended claims or the equivalents thereof.

The invention claimed is:

1. A data-display control method for image data in an imaging apparatus, the method comprising:
reading photographed data attribute information stored in a storing unit and acquiring photographing time information and positional information corresponding to image data included in the photographed data attribute information corresponding to images of plural different photographed image data files;
acquiring map information of a position corresponding to the positional information from a map database based on the acquired positional information corresponding to the image data; and
generating display information in which thumbnails corresponding to the images of the plural different photographed image data files are set on a map connected with one another to indicate a movement course of a user based on the photographing time information corresponding to the images of the image data files, wherein the movement course includes positions indicated by the photographing time information and the positional information corresponding to the images, respectively, of the image data files, the map being acquired from the map database based on the acquired positional information corresponding to the image data, wherein the movement course can be displayed in a first movement course mode and a second movement course mode, wherein in the first movement course mode a plurality of image data classified in one group are displayed to show one movement course and wherein in the second movement course a plurality of image data classified in different groups are displayed together to show one collective movement course, and
outputting the display information to a display unit.

2. A data-display control method according to claim 1, further comprising generating display information in which the thumbnails indicating the collective movement course of the user are displayed on the map.

3. A data-display control method according to claim 1, further comprising reading plural pieces of photographed data attribute information corresponding to plural different photographed image data files, merging the plural pieces of photographed data attribute information, and generating display information in which photographing positions of images included in the plural different photographed image data files are displayed on a map.

4. A non-transitory computer-readable medium on which is recorded a computer program that causes a computer to execute a data-display control method for image data in an imaging apparatus, the method comprising:
reading photographed data attribute information stored in a storing unit and acquiring photographing time information and positional information corresponding to image data included in the photographed data attribute information corresponding to images of plural different photographed image data files;

acquiring map information of a position corresponding to the positional information from a map database based on the acquired positional information corresponding to the image data; and generating display information in which thumbnails corresponding to the images of the plural different photographed image data files are set on a map connected with one another to indicate a movement course of a user based on the photographing time information corresponding to the images of the image data files, wherein the movement course includes positions indicated by the photographing time information and the positional information corresponding to the images, respectively, of the image data files, the map being acquired from the map database based on the acquired positional information corresponding to the image data, wherein the movement course can be displayed in a first movement course mode and a second movement course mode, wherein in the first movement course mode a plurality of image data classified in one group are displayed to show one movement course and wherein in the second movement course mode a plurality of image data classified in different groups are displayed together to show one collective movement course, and outputting the display information to a display unit.

* * * * *